US010625653B2

(12) United States Patent
Hambardzumyan et al.

(10) Patent No.: US 10,625,653 B2
(45) Date of Patent: Apr. 21, 2020

(54) LIFT GATE AND MOUNTING SYSTEM

(71) Applicant: MAXON INDUSTRIES, INC., Santa Fe Springs, CA (US)

(72) Inventors: Levon Hambardzumyan, Glendale, CA (US); Karapet Ablabutyan, Glendale, CA (US); Paul Bark, Canyon Lake, CA (US); Sheralin Lafferty, Pomona, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 362 days.

(21) Appl. No.: 15/640,123

(22) Filed: Jun. 30, 2017

(65) Prior Publication Data

US 2017/0297470 A1  Oct. 19, 2017

Related U.S. Application Data

(63) Continuation of application No. 14/395,269, filed as application No. PCT/US2013/038299 on Apr. 25, 2013, now Pat. No. 9,840,181.

(Continued)

(51) Int. Cl.
*F16B 21/09* (2006.01)
*F16B 1/02* (2006.01)
*B60P 1/44* (2006.01)

(52) U.S. Cl.
CPC .............. *B60P 1/4485* (2013.01); *B60P 1/44* (2013.01); *B60P 1/4414* (2013.01); *F16B 1/02* (2013.01);

(Continued)

(58) Field of Classification Search
CPC ......... B60P 1/44; B60P 1/4414; B60P 1/4485; Y10T 403/56; Y10T 403/70; F16B 1/02; F16B 21/09

See application file for complete search history.

(56) References Cited

U.S. PATENT DOCUMENTS 4,312,529 A  1/1982  Gillette
5,641,262 A *  6/1997  Dunlop ................ B60P 1/4414
                                                                    254/10 R (Continued)

FOREIGN PATENT DOCUMENTS

CA  2817007  5/2016

OTHER PUBLICATIONS

Final Office action for U.S. Appl. No. 14/395,269 dated Nov. 3, 2016.

(Continued)

*Primary Examiner* — Saul Rodriguez
*Assistant Examiner* — Ashley K Romano
(74) *Attorney, Agent, or Firm* — Brooks Acordia IP Law, PC; Michael Zarrabian

(57) ABSTRACT

A mounting system for mounting a lift gate on a structure is provided, the lift gate having a lift platform supported between a pair of spaced support columns. The mounting system comprises a first mounting member configured for attachment onto said structure, wherein the first mounting member includes a support protrusion for engaging an opening in a wall of a corresponding lift gate support column. The mounting system further comprises a second mounting member configured for attachment onto said structure, wherein the second mounting member includes a support protrusion for engaging an opening in a wall of a corresponding lift gate support column. When the mounting members are attached to the structure and the corresponding lift gate support columns are mounted on the support protrusions, the mounting members support the lift gate on the structure.

18 Claims, 41 Drawing Sheets

Related U.S. Application Data

(60) Provisional application No. 61/776,541, filed on Mar. 11, 2013, provisional application No. 61/638,875, filed on Apr. 26, 2012.

(52) U.S. Cl.
CPC ............. *F16B 21/09* (2013.01); *Y10T 403/56* (2015.01); *Y10T 403/70* (2015.01)

(56) References Cited

U.S. PATENT DOCUMENTS

| | | |
|---|---|---|
| 6,183,187 B1 | 2/2001 | Ablabutyan |
| 6,893,203 B2 | 5/2005 | Anderson et al. |
| 6,948,903 B2 | 9/2005 | Ablabutyan et al. |
| 7,762,756 B1 | 7/2010 | Ablabutyan et al. |
| 2006/0245885 A1 | 11/2006 | Ablabutyan et al. |
| 2009/0072570 A1 | 3/2009 | Savoy |
| 2010/0313479 A1 | 12/2010 | Bark |
| 2014/0003897 A1 | 1/2014 | Ablabutyan |

OTHER PUBLICATIONS ntemational Search Report and Written Opinion dated Sep. 4, 2013 for International Application No. PCT/US13/38299.
Non-Final Office action for U.S. Appl. No. 14/395,269 dated Mar. 23, 2016.
Notice of Allowance for U.S. Appl. No. 14/395,269 dated Apr. 4, 2017.
Notification Concerning Transmittal of International Preliminary Report on Patentability for serial No. PCT/US2013/03299 dated Nov. 6, 2014.

\* cited by examiner

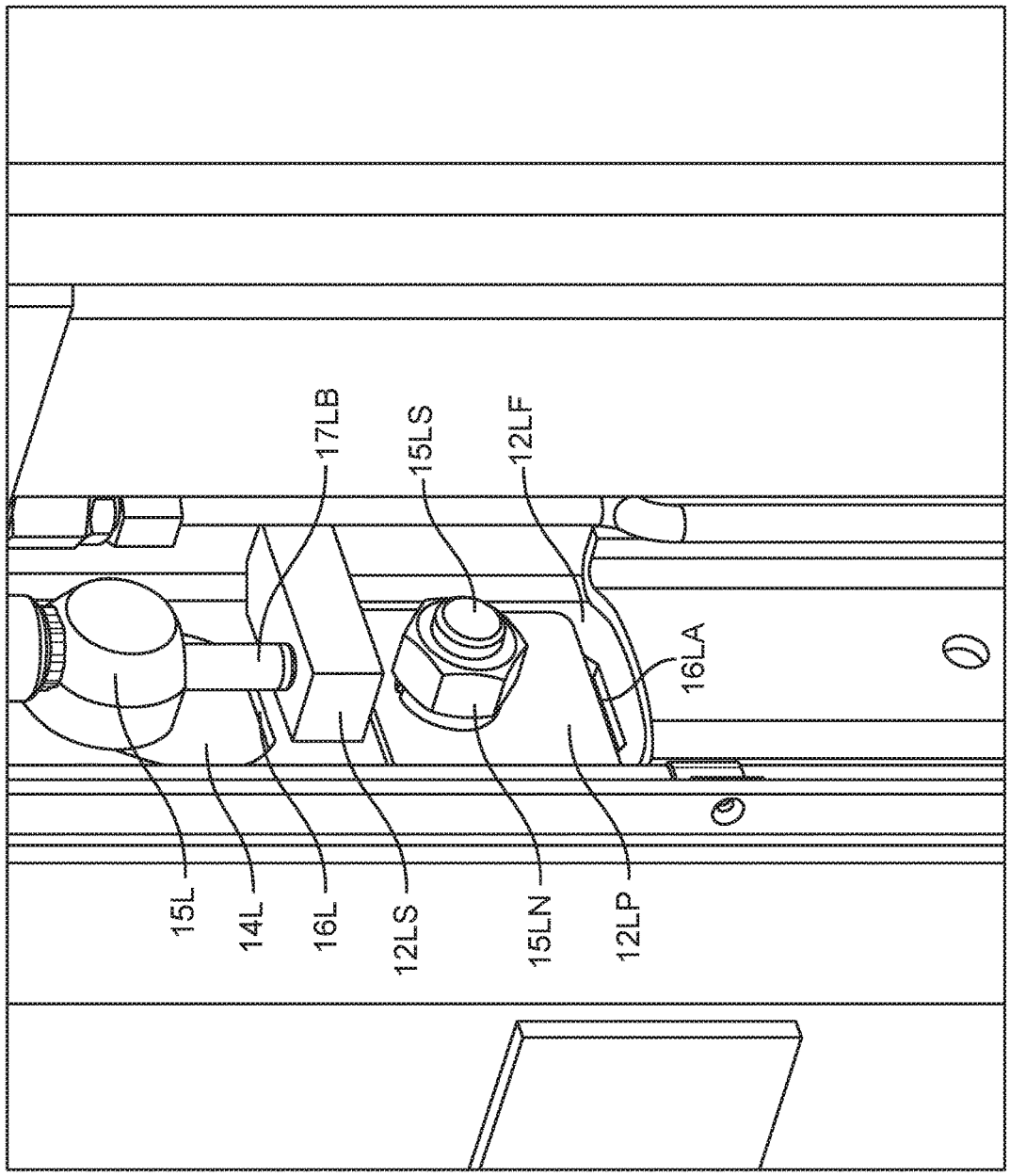

LIFT GATE AND MOUNTING SYSTEM

CROSS REFERENCE TO RELATED APPLICATIONS

This application is a continuation of U.S. Nonprovisional patent application Ser. No. 14/395,269, filed Oct. 17, 2014, which is the U.S. National Phase patent application under 35 U.S.C. § 371 of International Application Number PCT/US2013/38299, filed Apr. 25, 2013, which claims the priority benefit of U.S. Provisional Patent Application Ser. No. 61/638,875 filed Apr. 26, 2012, and further this application claims the priority benefit of U.S. Provisional Patent Application Ser. No. 61/776,541 filed Mar. 11, 2013, all of which are incorporated herein by reference in their entirety.

BACKGROUND

Field of the Invention

The present invention relates generally to lift gates and, in particular, to mounting systems for lift gates.

Description of Related Art

One type of a lift gate system comprises a load elevator in the form of a lift gate including a dual lift system having a parallel pair of vertically extending columns, each having a vertically-disposed hydraulic cylinder for vertically raising and lowering a load carried by the pair of cylinders.

Such a lift gate includes a rigid H-frame having said parallel pair of upstanding columns. The columns contain a corresponding pair of vertically-disposed hydraulic cylinders having runners interconnected by a transverse stabilizing bar typically supporting a two-section foldable lifting platform actuated on each side by an actuating linkage system.

Lift gates are typically mounted at a structure such as an opening at the rear of a vehicle to lift payloads on a lift platform from one level (e.g., ground level) up to another level (e.g., the bed of the vehicle), and vice versa.

BRIEF SUMMARY

An embodiment of a mounting system for mounting a lift gate on a structure is provided, wherein the lift gate has a lift platform supported between a pair of spaced support columns. The mounting system comprises a first mounting member configured for attachment onto said structure, wherein the first mounting member includes a support protrusion for engaging an opening in a wall of a corresponding lift gate support column. The mounting system further comprises a second mounting member configured for attachment onto said structure, wherein the second mounting member includes a support protrusion for engaging an opening in a wall of a corresponding lift gate support column. When the mounting members are attached to the structure and the corresponding lift gate support columns are mounted on the support protrusions, the mounting members support the lift gate on the structure.

These and other features, aspects and advantages of the present invention will become understood with reference to the following description, appended claims, and accompanying figures.

BRIEF DESCRIPTION OF THE DRAWINGS

FIG. 37B shows a more detailed view of the interior of left side support column of the lift gate as mounted on the corresponding mounting member in FIG. 31, according to one embodiment.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments of a lift system (including a lift gate), a mounting system for mounting the lift gate on a vehicle, and a method of mounting the lift gate on the vehicle using the mounting system, are disclosed herein.

An embodiment of a mounting system for mounting a lift gate on a structure is provided, wherein the lift gate has a lift platform supported between a pair of spaced support columns. The mounting system comprises a first mounting member configured for attachment onto said structure, wherein the first mounting member includes a support protrusion for engaging an opening in a wall of a corresponding lift gate support column. The mounting system further comprises a second mounting member configured for attachment onto said structure, wherein the second mounting member includes a support protrusion for engaging an opening in a wall of a corresponding lift gate support column. When the mounting members are attached to the structure and the corresponding lift gate support columns are mounted on the support protrusions, the mounting members support the lift gate on the structure.

Figure 1:
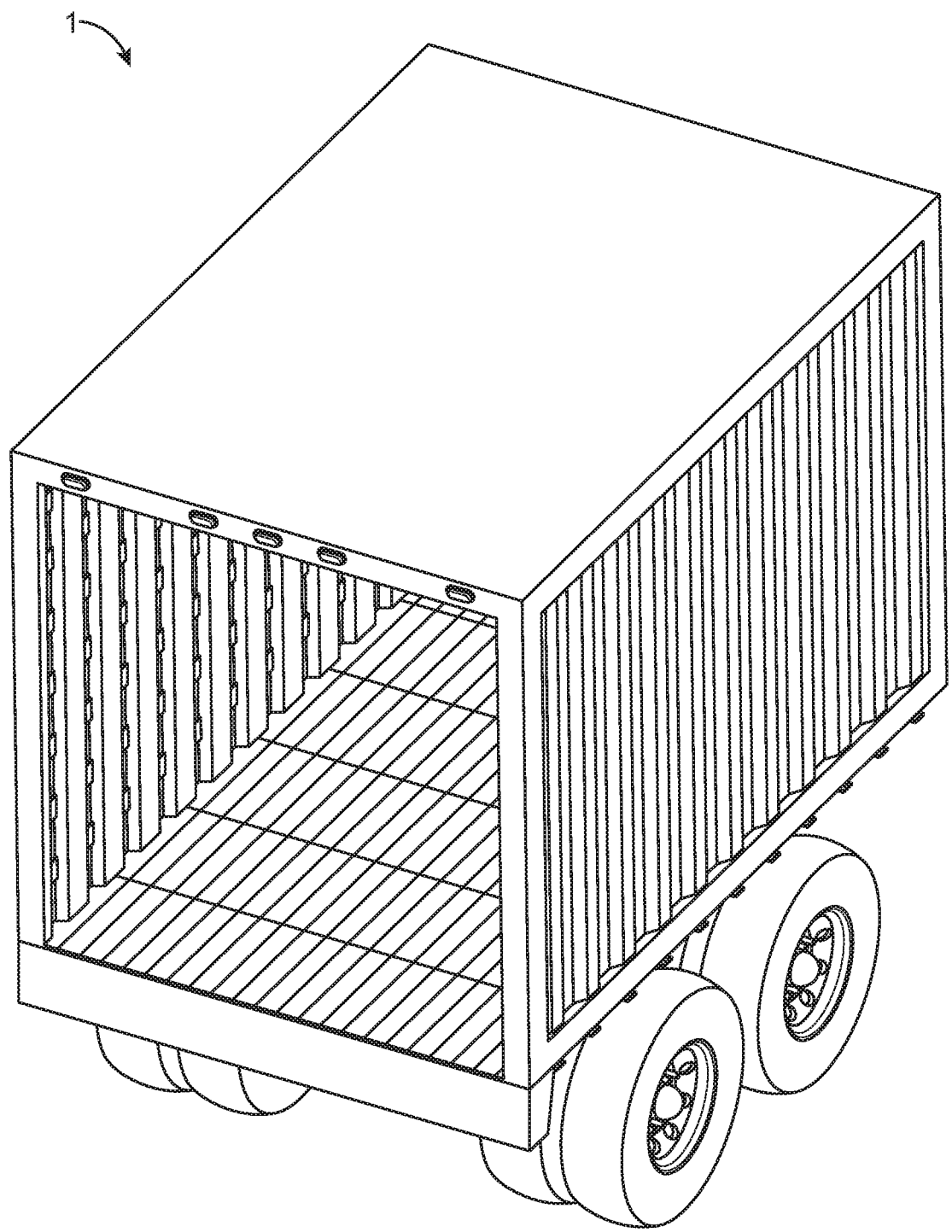
FIG. 1 shows an example vehicle, such as truck with a rear opening, suitable for installing a lift gate, according to one embodiment.
Figure 13:
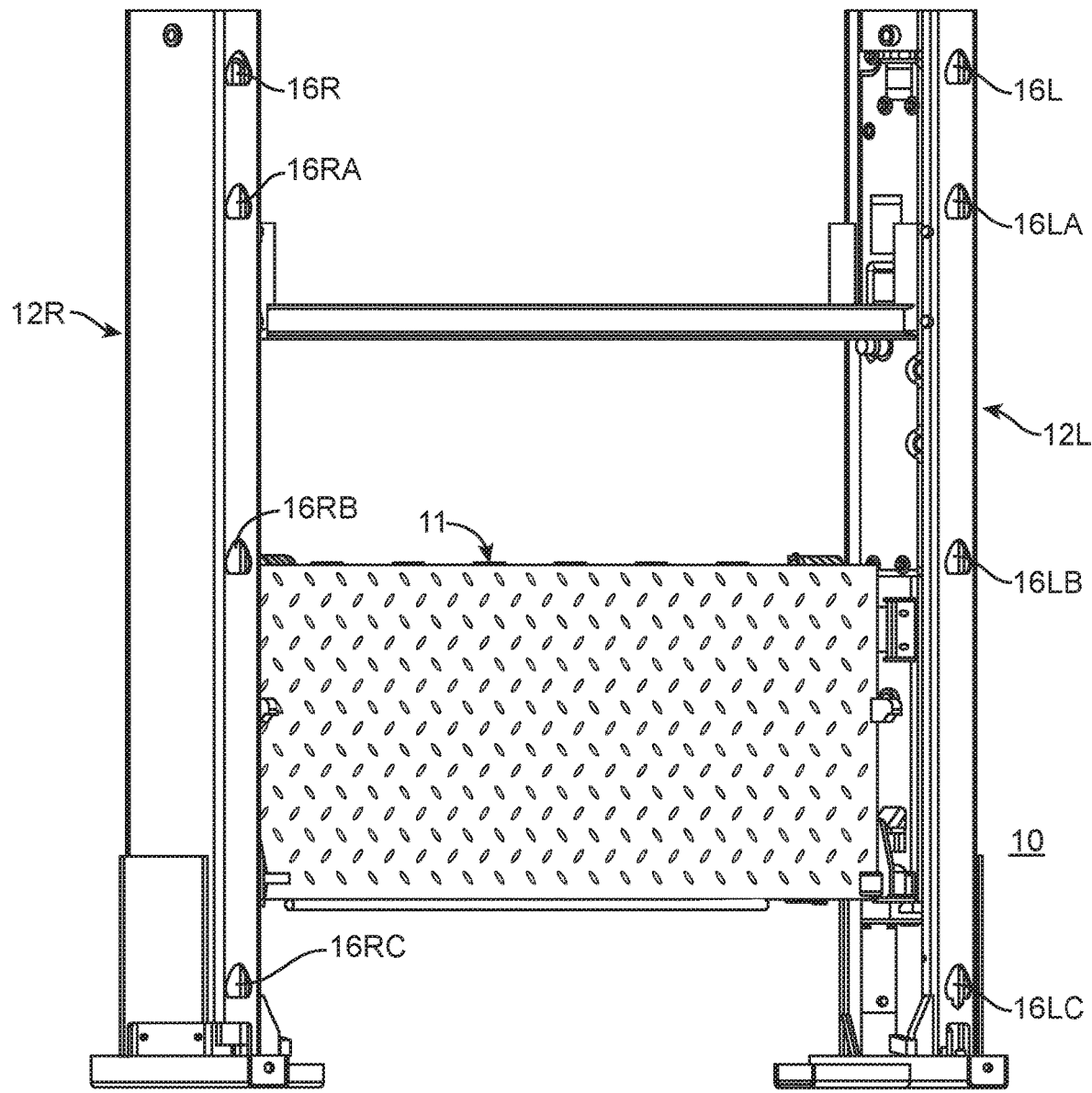
FIG. 13 shows a perspective view of an un-mounted lift gate, according to one embodiment.

FIG. 1 shows an example vehicle 1, such as truck with a rear opening, suitable for installing a lift gate. In one embodiment, a lift gate system comprises a load elevator in the form of a lift gate. FIG. 13 shows an embodiment of a lift gate 10. The lift gate 10 provides a dual lift system including said parallel pair of vertically extending columns, each having a vertically-disposed hydraulic cylinder for vertically raising and lowering a load carried by the pair of cylinders.

The lift gate includes a rigid H-frame having said parallel pair of upstanding columns. The columns contain a corresponding pair of vertically-disposed hydraulic cylinders having runners interconnected by a transverse stabilizing bar typically supporting a two-section foldable lifting platform actuated on each side by an actuating linkage system. The lift gate 10 includes a lift platform 11 supported between a left support column 12L and right support column 12R. The support columns 12L, 12R include actuators, 300 for lowering/raising the platform 11.

Figure 16:
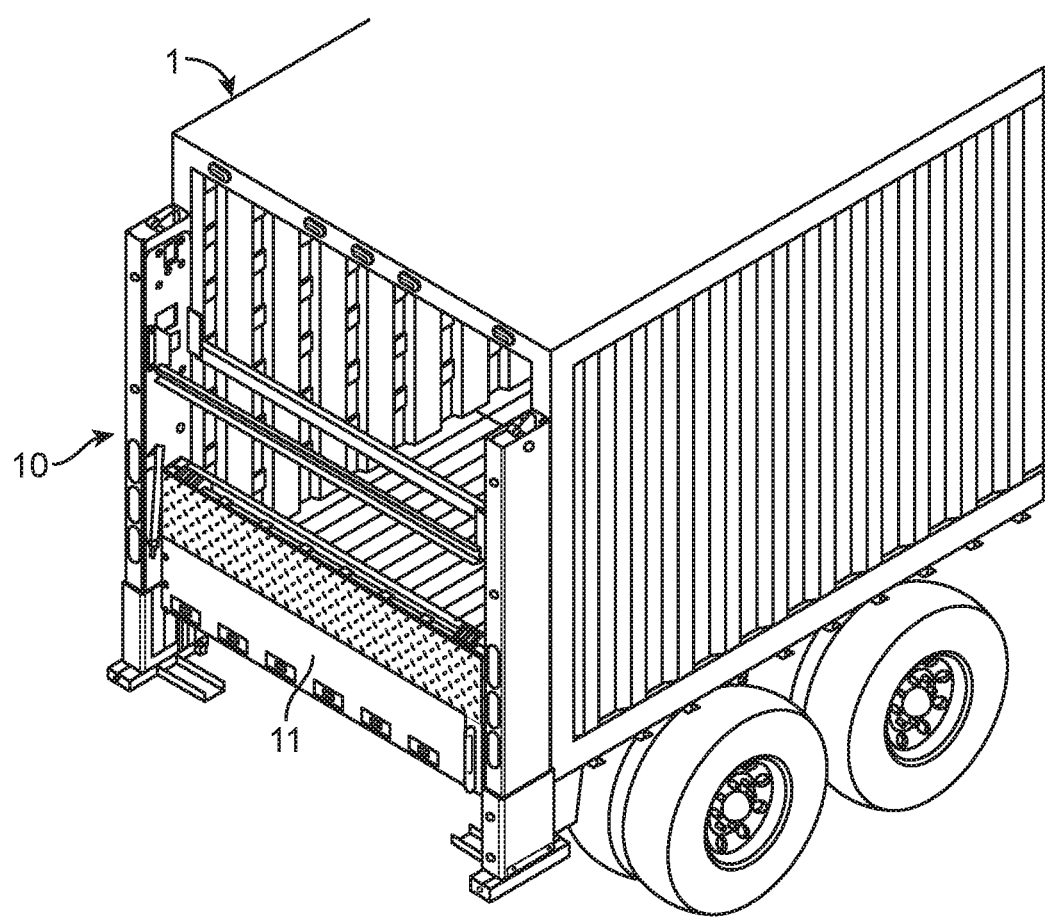
FIG. 16 shows the lift gate mounted at a structure such as an opening at the rear of the vehicle using a mounting system, according to one embodiment.

As shown in FIG. 16, the lift gate 10 is mounted at a structure such as an opening at the rear of the vehicle 1 using a mounting system in one embodiment. The lift gate 10 allows lifting payloads on the platform 11 from one level (e.g., the ground level) up to another level (e.g., the bed of the vehicle), or vice versa.

Figure 5:
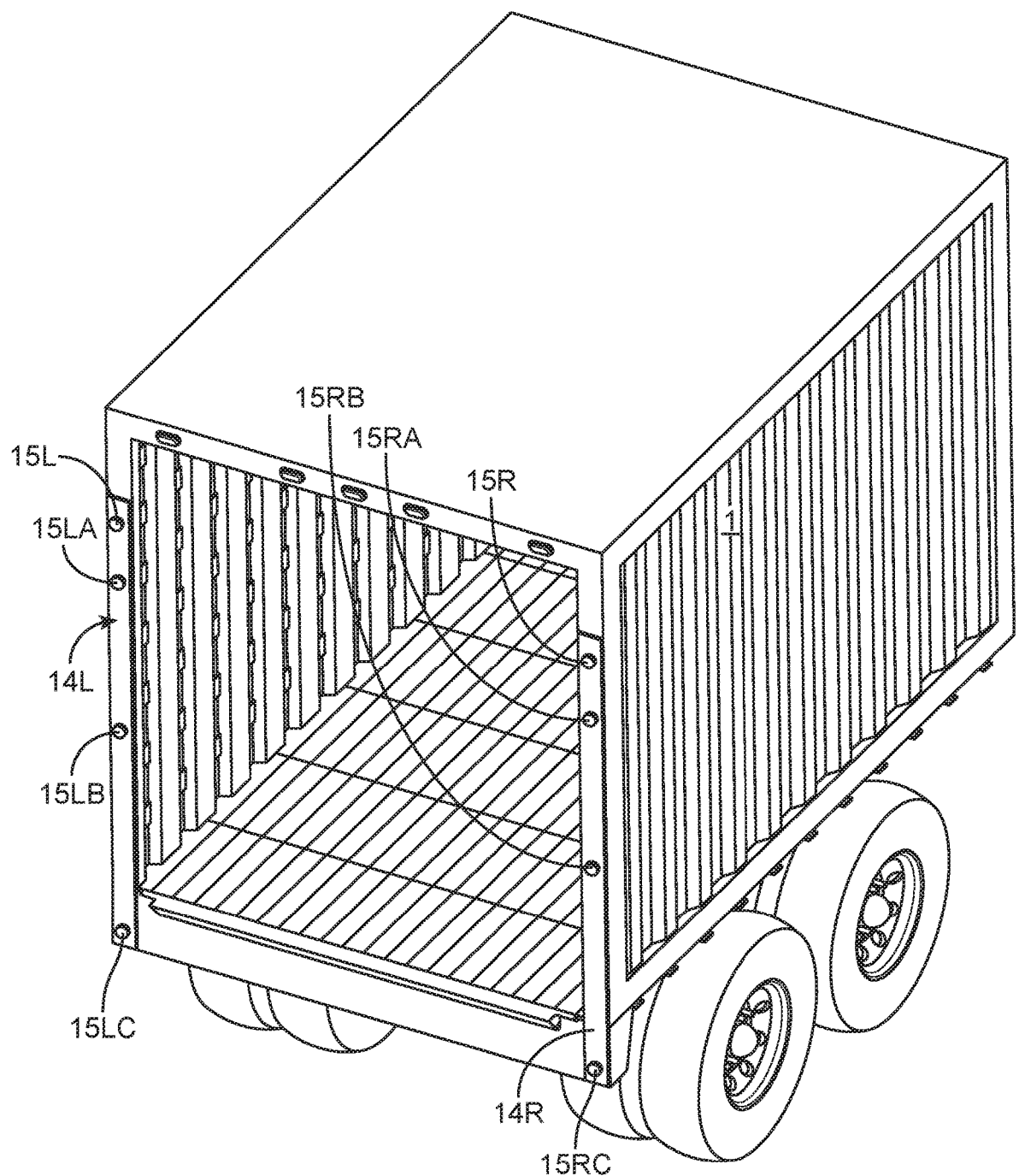
FIG. 5 shows a mounting system including a left mounting member and a right mounting member, according to one embodiment.

As shown in FIG. 5, in one embodiment, a mounting system according to an embodiment of the invention includes a left mounting member 14L and a right mounting member 14R. The mounting members 14L and 14R are for attachment onto left and right perimeters, respectively, of an opening in the vehicle body 1, such as by welding to the vehicle body.

In one example, each of the mounting members 14L, 14R comprises an elongate and essentially planar member (mounting plate). Each of the mounting members 14L, 14R can be attached to the vehicle body, such as by welding, for mounting the lift gate 10 thereon.

As shown in FIG. 5, in one embodiment, the mounting member 14L includes at least one support protrusion 15L, and the mounting member 14R includes at least one support protrusion 15R. The protrusions 15L and 15R comprise structures configured for supporting (e.g., hanging) the lift gate 10 on the mounting members 14L and 14R, respectively. The protrusions 15L and 14R can be of different configurations, examples of which are described herein.

As shown in FIG. 13, the right support column 12R is hollow and generally elongate with a rectangular cross section. Actuators for moving the platform 11 are disposed within the support column 12R. In one embodiment the support column 12R and includes an opening 16R on a front wall thereof.

Similarly, the left support column 12L is hollow and generally elongate with a rectangular cross section and includes an opening 16L on a front wall thereof. Actuators for moving the platform 11 are disposed within the support column 12L.

The openings 16L, 16R correspond to the protrusions 15L, 15R, respectively, for mounting the lift gate 10 (via the left and right support columns 12L, 12R) on the vehicle opening (via the left and right mounting members 14L, 14R).

Figure 2:
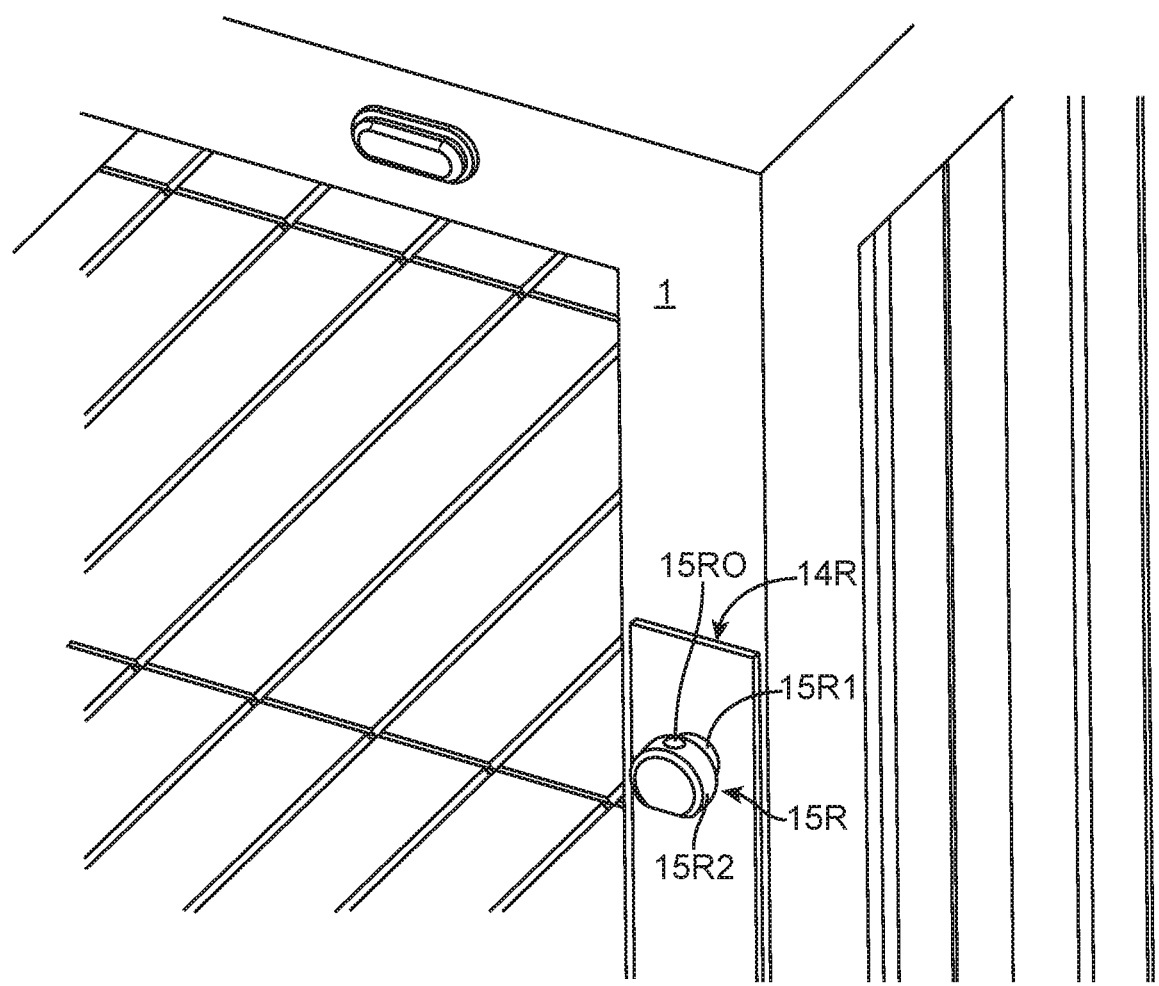
FIG. 2 shows a perspective view of one example configuration of a mounting member including a support protrusion mounted on an example vehicle, according to one embodiment.

One example configuration of the protrusion 15R is shown in perspective view in FIG. 2. In this example, the protrusion 15R is essentially cylindrical having a first cylindrical portion 15R1 and a second essentially cylindrical portion 15R2. The portion 15R2 is larger in diameter than the portion 15R1.

Figure 3A:
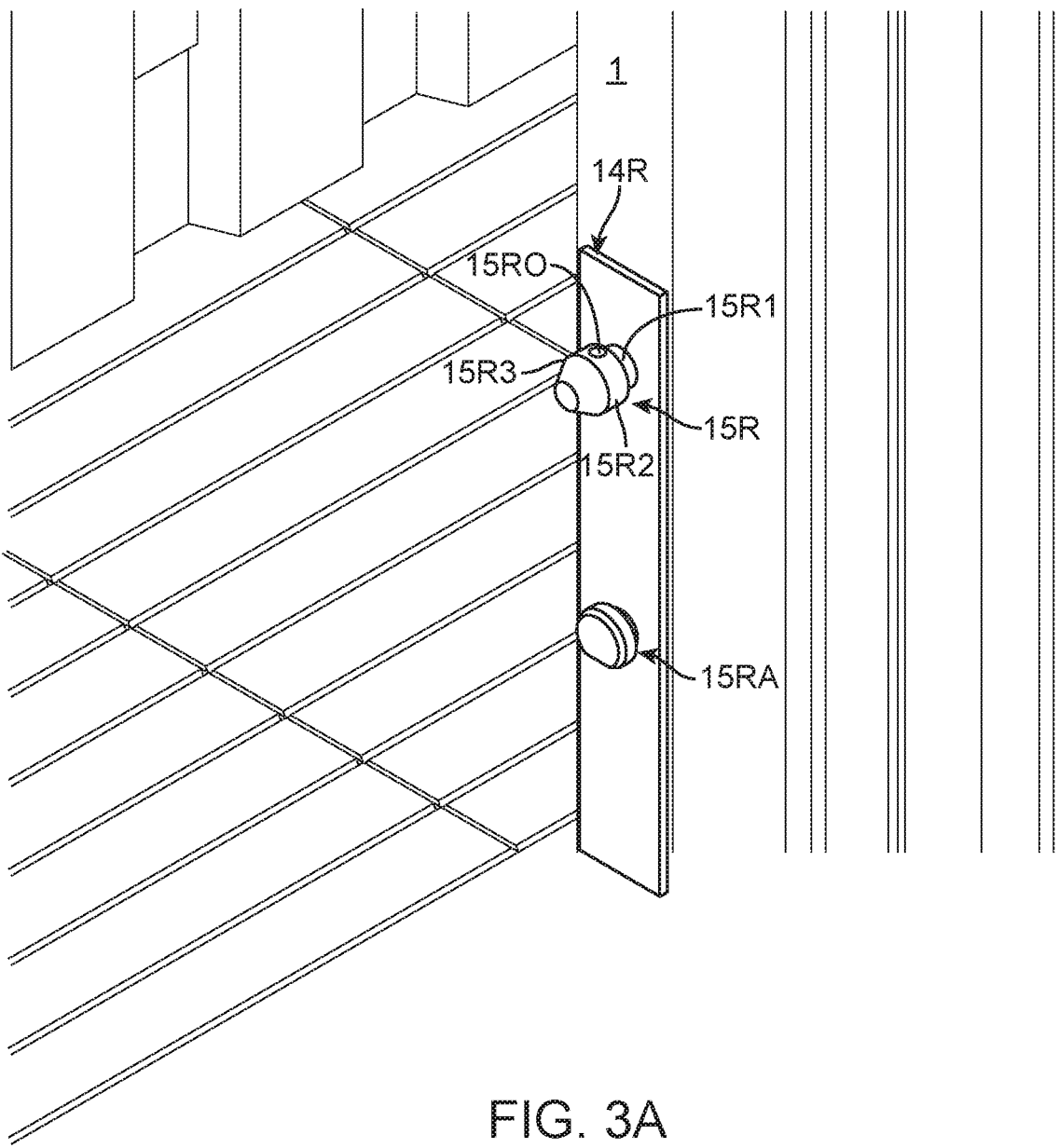
FIG. 3A shows a more detailed perspective view of a right side mounting member including a support protrusion, mounted on the vehicle, according to one embodiment.

Another example configuration of the protrusion 15R is shown in perspective view in FIG. 3A. In this example, the protrusion 15R is essentially conical having a first cylindrical portion 15R1, a second essentially cylindrical portion 15R2, and an essentially conical portion 15R3. The portion 15R2 is larger in diameter than the portion 15R1. The conical portion 15R3 can function as a guide for the corresponding opening 16R of said support column 12R as the lift gate 10 is moved towards the mounting member 14R for mounting onto the vehicle body 1.

Figure 3B:
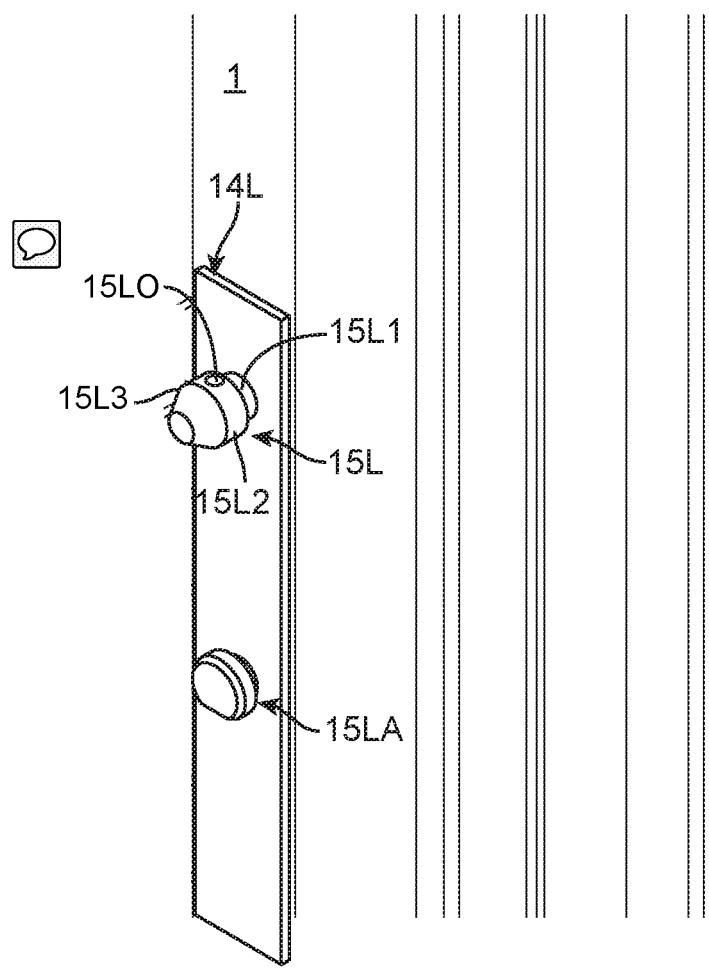
FIG. 3B shows a more detailed perspective view of a left side mounting member including a support protrusion, mounted on the vehicle, according to one embodiment.

An example configuration of the protrusion 15L is shown in perspective view in FIG. 3B. Similarly, the protrusion 15L is essentially conical having a first cylindrical portion 15L1, a second essentially cylindrical portion 15L2 and an essentially conical portion 15L3. The portion 15L2 is larger in diameter than the portion 15L1. The conical portion 15L3 can function as a guide for the corresponding opening 16L of said support column 12L as the lift gate 10 is moved towards the mounting member 14L for mounting on the vehicle 1.

In one embodiment the protrusions 15L, 15R and the corresponding openings 16L, 16R are sized and shaped to interrelate and engage. To mount the lift gate 10 on the vehicle body, in one example, the mounting members 14L, 14R are attached to the perimeter of an opening at the back of the vehicle 1.

Figure 4:
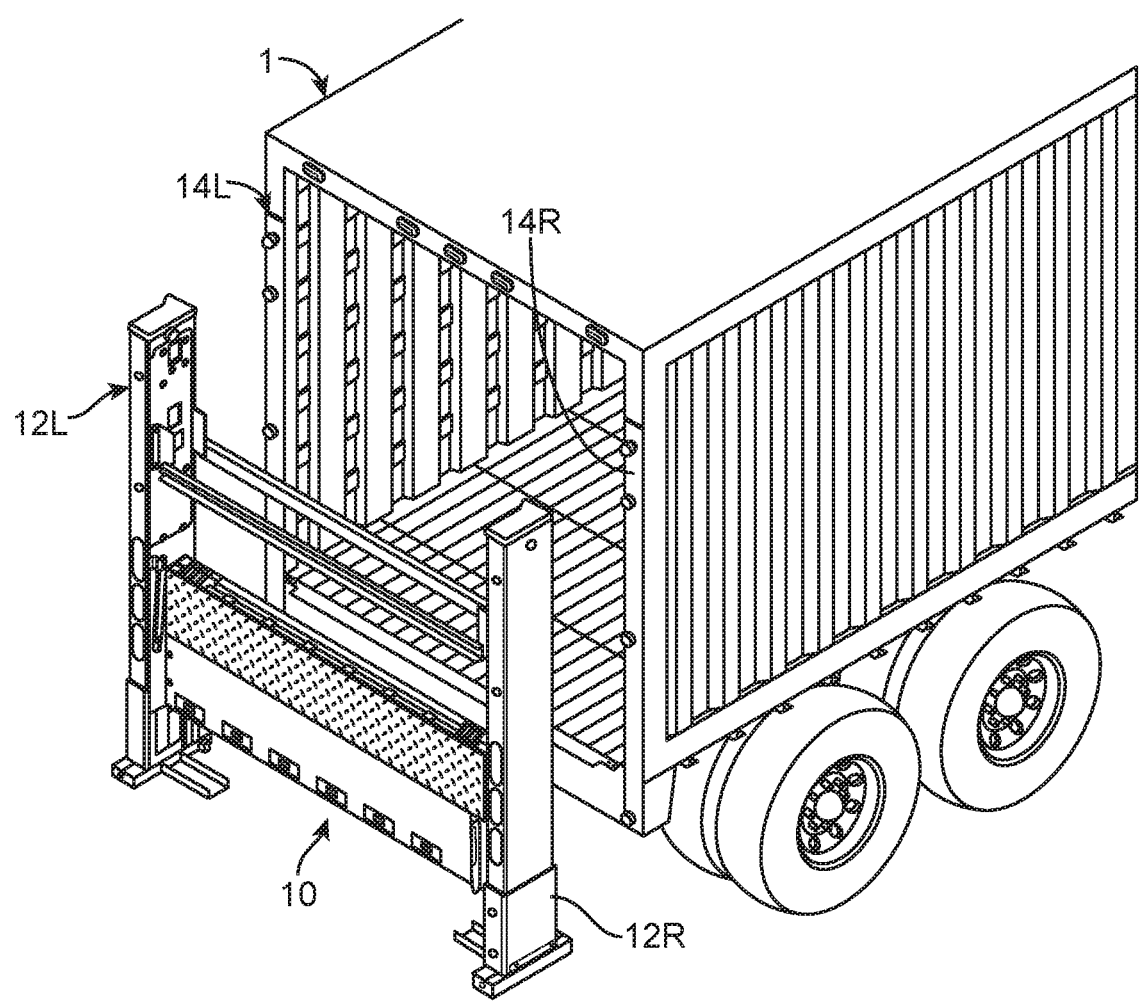
FIG. 4 shows a lift gate centered on the back of the vehicle, according to one embodiment.
Figure 6:
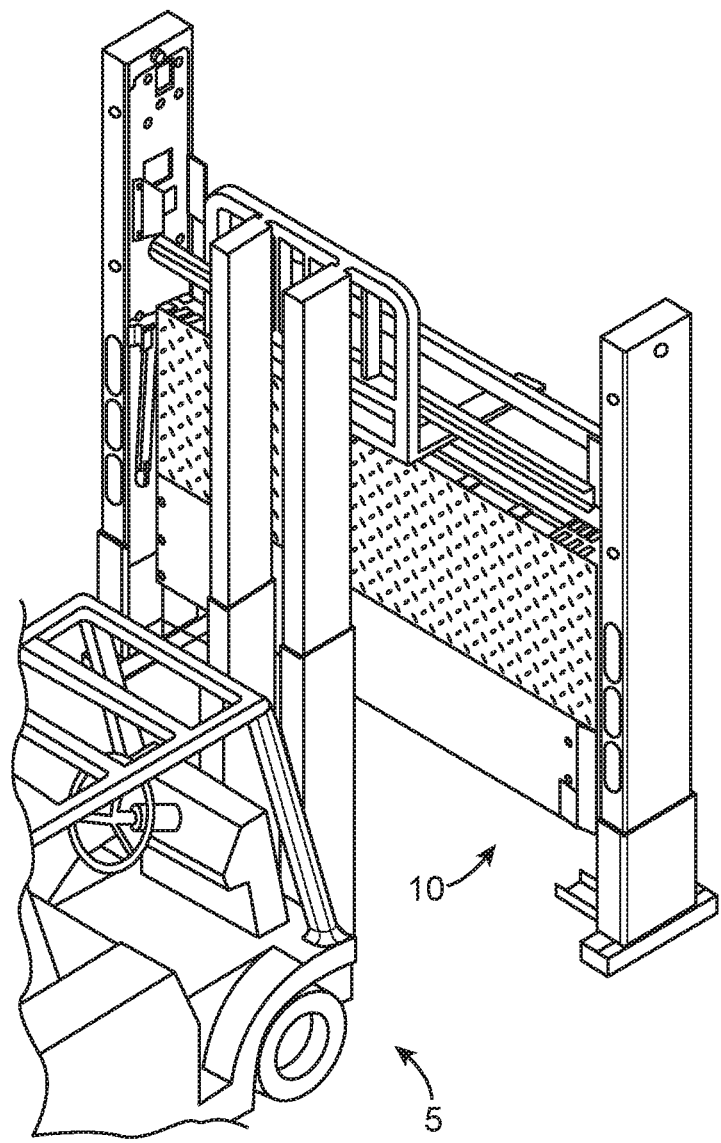
FIG. 6 shows a forklift centering a lift gate onto the back of the vehicle (not shown), according to one embodiment.

The lift gate 10 is centered on the back of the vehicle 1 as shown in FIG. 4 via a forklift 5 (FIG. 6) or overhead hoist, wherein openings 16L, 16R on the lift gate columns 12L, 12R line up with the respective protrusions 15L, 15R of the mounting members 14L, 14R on the vehicle 1.

Figure 7:
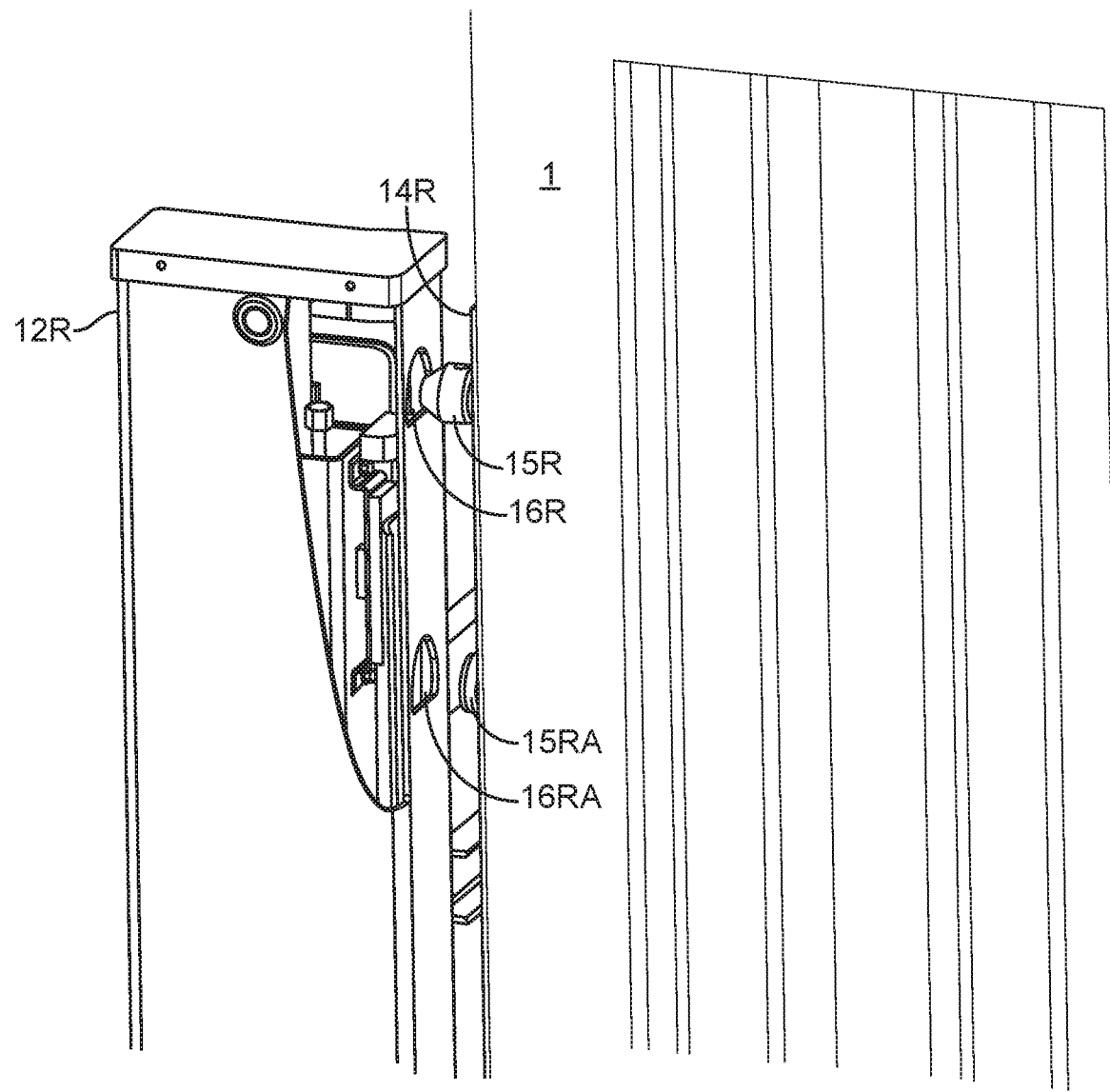
FIG. 7 shows a right side perspective view of the openings of a lift gate column aligned with the corresponding mounting member pre-mounted on the vehicle, according to one embodiment.
Figure 8:
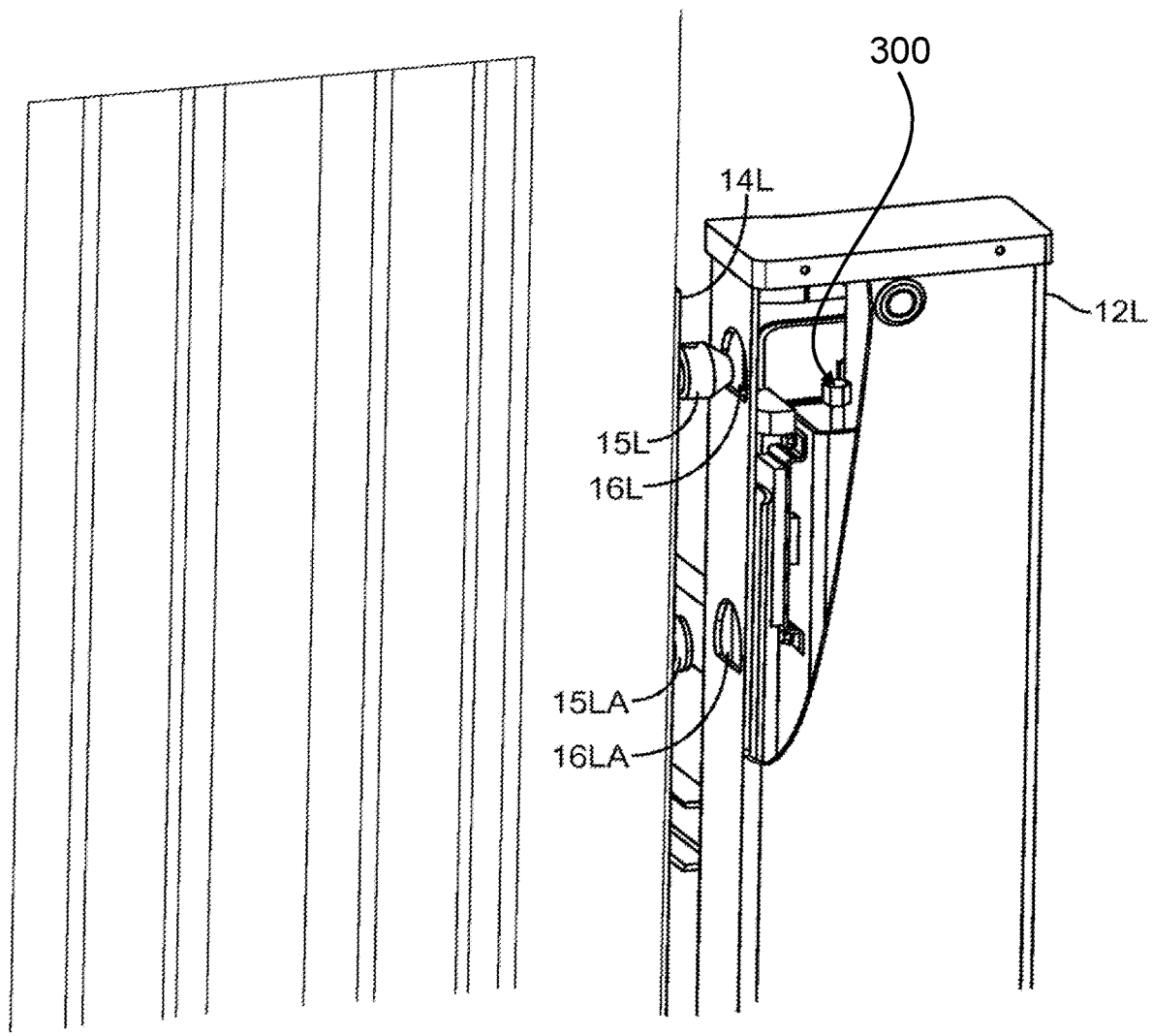
FIG. 8 shows a left side perspective view of the openings of a lift gate column aligned with the corresponding mounting member pre-mounted on the vehicle, according to one embodiment.
Figure 9:
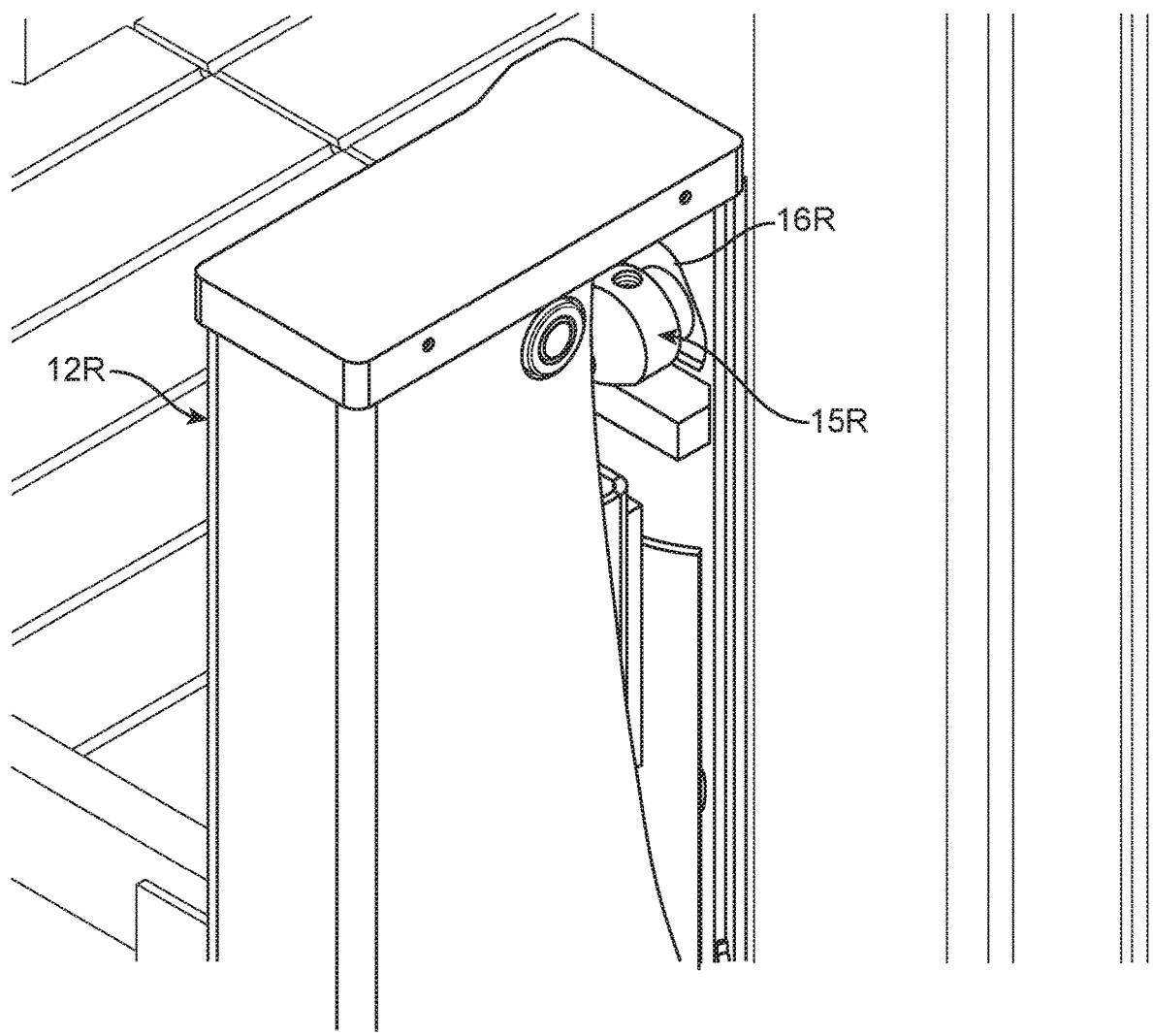
FIG. 9 shows a perspective view of the column openings in FIG. 8 receiving the protrusions of the corresponding mounting member such that the lift gate essentially hangs from the protrusions on the mounting member via the openings, according to one embodiment.
Figure 10:
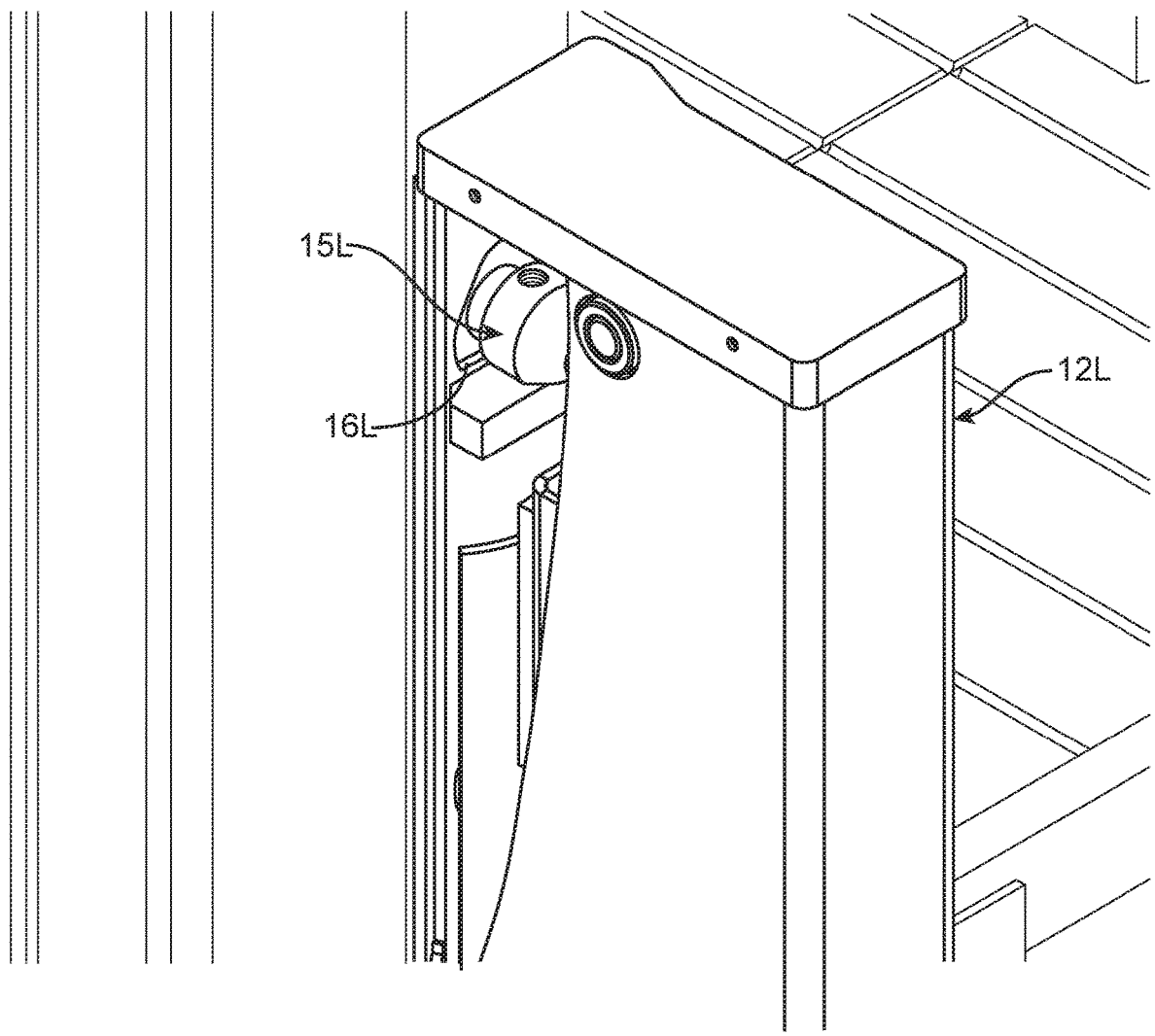
FIG. 10 shows a perspective view of the column openings in FIG. 7 receiving the protrusions of the corresponding mounting member such that the lift gate essentially hangs from the protrusions on the mounting member via the openings, according to one embodiment.
Figure 11:
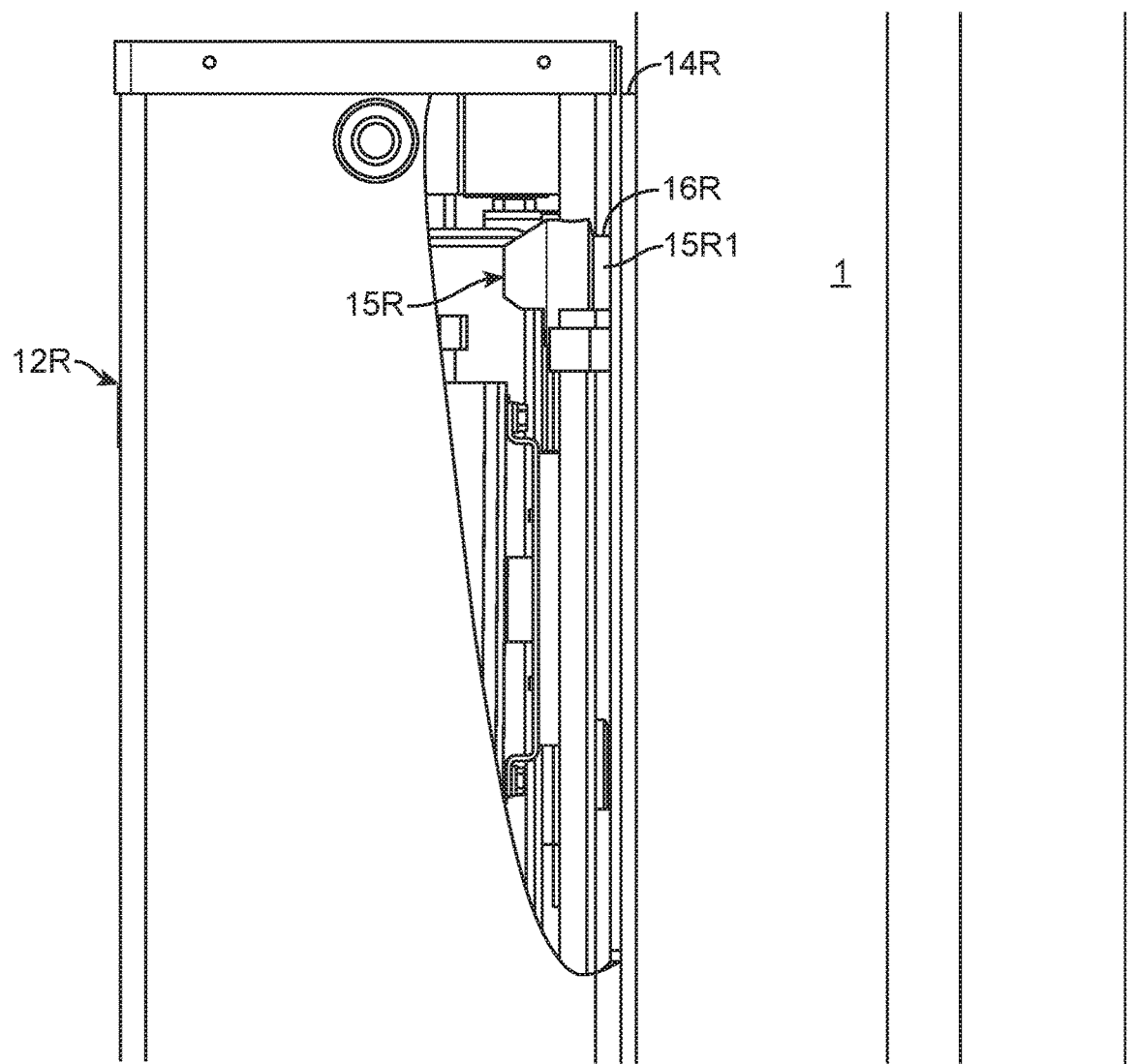
FIG. 11 shows a right side view corresponding to FIG. 9, according to one embodiment.
Figure 12:
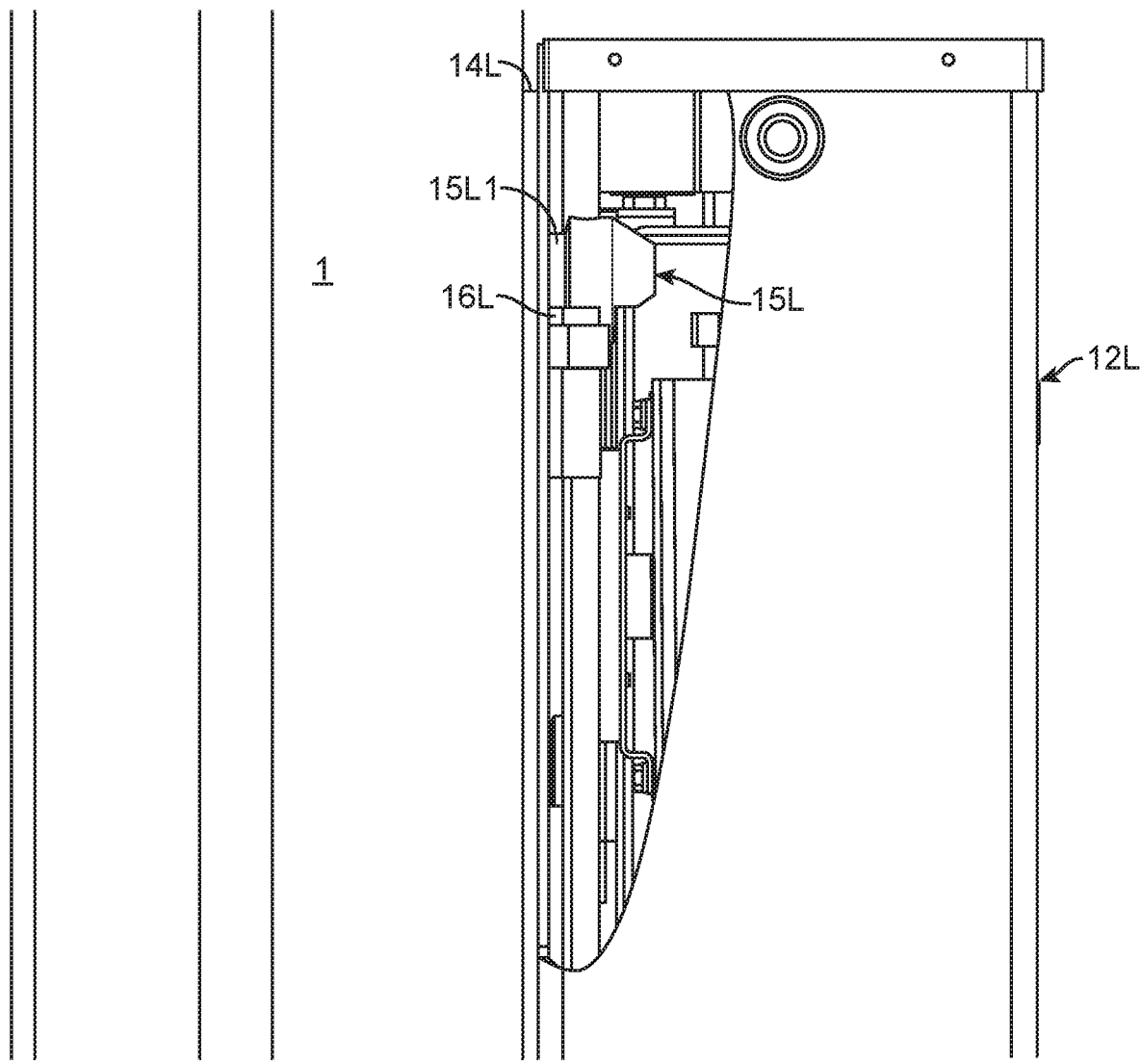
FIG. 12 shows a left side view corresponding to FIG. 10, according to one embodiment.

Specifically, as shown in FIGS. 7-8, the openings 16L, 16R of the lift gate columns 12L, 12R are aligned with the mounting members 14L, 14R pre-mounted on the vehicle, wherein the openings 16L, 16R receive the protrusions 15L, 15R as shown in perspective views in FIGS. 9-10, such that the lift gate 10 essentially hangs from the protrusions 15L, 15R on the mounting members via the openings 16L, 16R. FIGS. 11 and 12 show side views corresponding to FIGS. 9 and 10, respectively.

Figure 14:
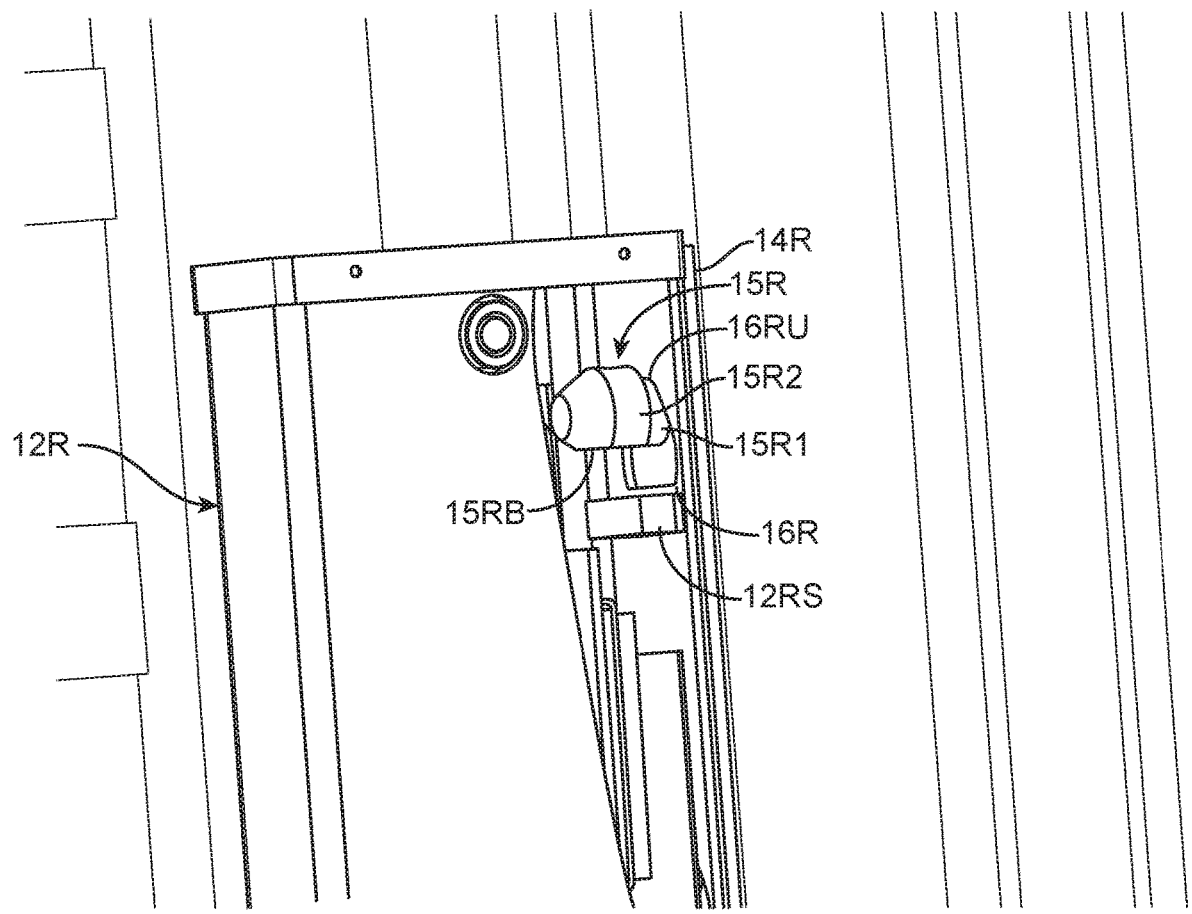
FIG. 14 shows a partially cut view of a support column in FIG. 9 receiving the protrusions of corresponding mounting member, according to one embodiment.

In one embodiment as shown in FIG. 14, once the corresponding opening 16R of the support column 12R receives the protrusion 15R, the lift gate 10 is released by the fork lift 5, wherein the support column 12R essentially hangs by its weight from the portion 15R1 of the protrusion 15R on the upper periphery 16RU of the opening 16R resting on the portion 15R1. The larger diameter portion 15R2 maintains the support column 12R, hanging from (resting on) the portion 15R1, between the mounting member 14R and the portion 15R2.

Figure 15:
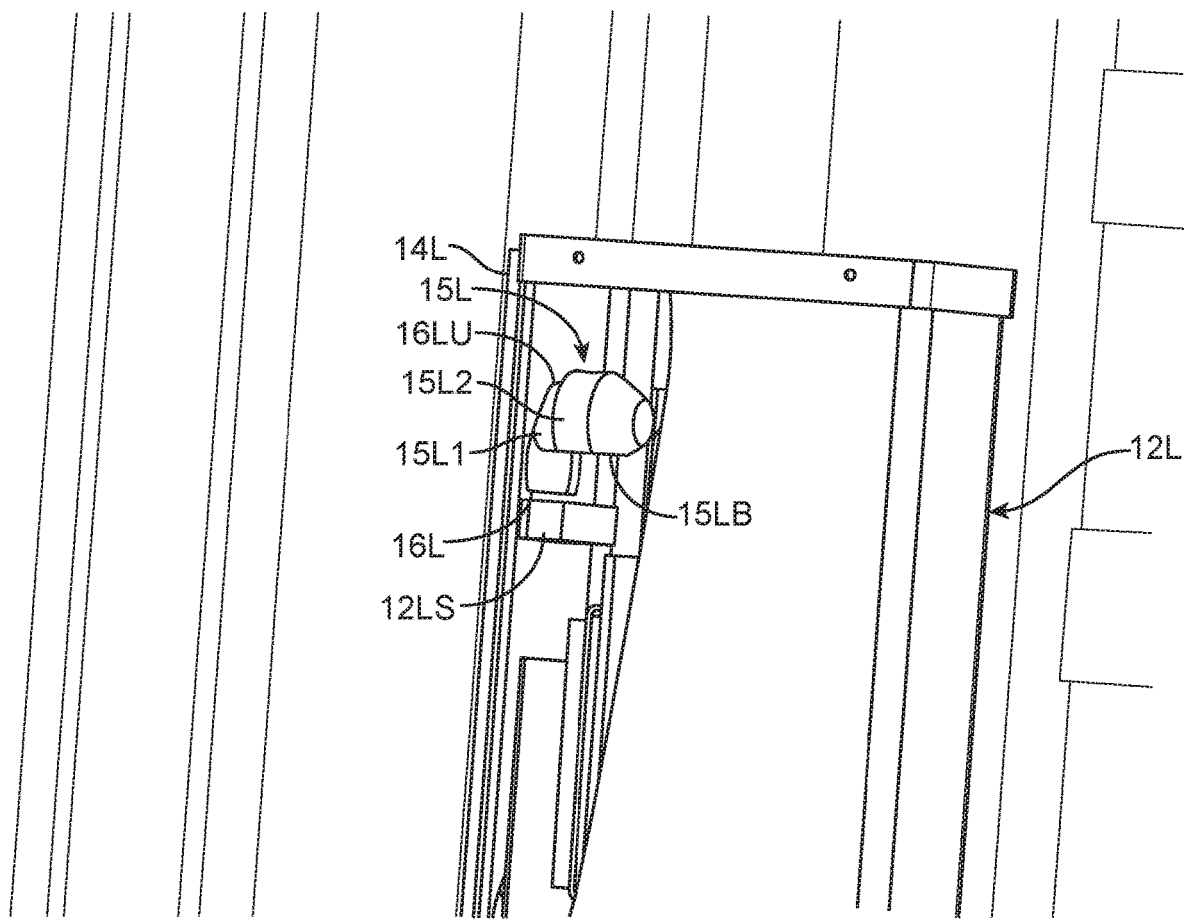
FIG. 15 shows a partially cut view of a support column in FIG. 10 receiving the protrusions of corresponding mounting member, according to one embodiment.

In this example as shown in FIG. 15, the protrusion 15L has a similar configuration to the protrusion 15R, and functions in the same manner in relation to the corresponding opening 16L of the support column 12L. The larger diameter portion 15L2 maintains the support column 12L, hanging from (resting on) the portion 15L1, between the mounting member 14L and the portion 15L2.

Once the corresponding opening 16L of the support column 12L receives the protrusion 15L, the lift gate 10 is released by the fork lift 5, wherein the support column 12L essentially hangs by its weight from the portion 15L1 of the protrusion 15L on the upper periphery 16LU of the opening 16L resting on the portion 15L1.

The larger diameter portion 15L2 maintains the support column 12L, hanging from the portion 15L1, between the mounting member 14L and the portion 15L2.

In one embodiment, the protrusions (hangers) 15R, 15L of vehicle installed mounting members 14R, 14L are weight bearing protrusions which bear the weight of the support columns and the lift platform of a mounted lift gate 10.

In the embodiments described herein, the openings 16R and 16L have a generally triangular shape without rounded vertices, however configuration of the openings 16R and 16L can be different depending on the configuration of the protrusions 15R and 15L. The curvature of the upper peripheries of the openings 16R and 16L are shaped to essentially match the curvature of the protrusion portions 15R1 and 15L1, respectively, for even distribution of the weight of the lift gate (and load) on the protrusion portions 15R1 and 15L1 via the upper peripheries of the openings 16R and 16L.

In one embodiment, a bottom section 15RB of the protrusion portion 15R2 is flat, as shown in FIG. 14. In one embodiment, a bottom section 15LB of the protrusion portion 15L2 is flat, as shown in FIG. 15.

Each mounting member (or mounting bracket) may include additional protrusions spaced from one another. For example, the mounting member 14R may further include additional protrusions 15RA, 15RB, and 15RC (FIG. 5). The support column 12R has additional openings 16RA, 16RB, and 16RC (FIG. 13) for receiving the corresponding protrusions 15RA, 15RB and 15RC (FIG. 5), respectively.

Said additional protrusions 15RA, 15RB, and 15RC may be similar to protrusion 15R in configuration. Said additional openings 16RA, 16RB and 16RC may be similar to the opening 16R in configuration. The additional protrusions may comprise weight bearing structures as in protrusion 15R.

Similarly, the mounting member 14L may further include protrusions 15LA, 15LB, and 15LC. The support column 12L has openings 16LA, 16LB and 16LC for receiving the corresponding protrusions 15LA, 15LB and 15LC, respectively.

In one embodiment, the mounting system further includes a securing mechanism for each support column to secure that support column to the corresponding mounting member on the vehicle 1. Referring to FIGS. 18-25, in a first implementation of said securing mechanism comprises a securing device 17R for the mounting member 14R to further secure the support column 12R to the mounting member 14R on the vehicle 1. The securing device 17R comprises a wedge member 17RW and a corresponding threaded bolt 17RB and threaded nut 17RN.

The wedge member 17RW is essentially L-shaped in profile, having a top portion 17RT and a transverse wedge-shaped portion 17RP. The top portion 17RT includes an opening 17RO therethrough for freely receiving the bolt 17RB. Further, as shown in FIG. 2, the protrusion 15R includes an opening 15RO through the portion 15R2 for receiving the bolt 17RB.

Figure 20:
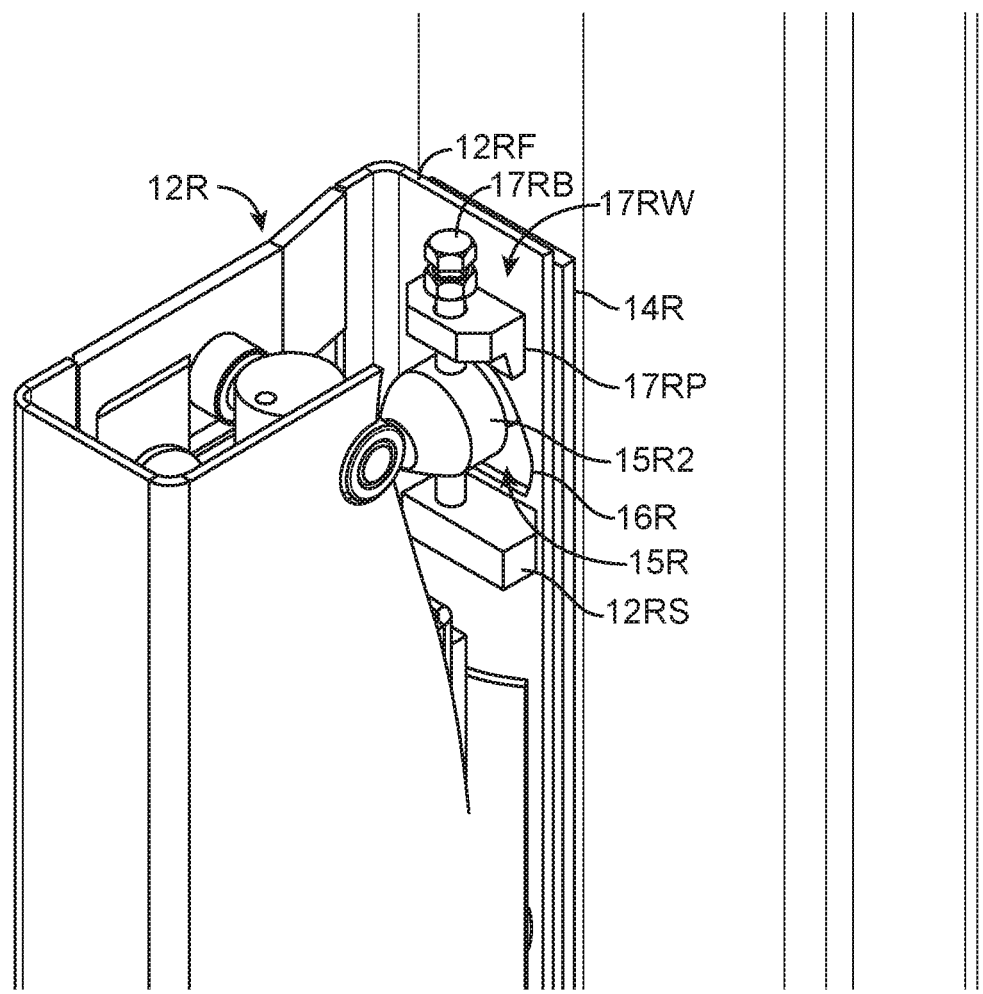
FIG. 20 shows a perspective view of an assembled securing mechanism comprising a securing device for a right side mounting member to secure the support column to the corresponding mounting member on the vehicle, according to one embodiment.

After the support column 12R is mounted (via the opening 16R) on the protrusion 15R of the mounting member 14R, as shown in FIG. 20, the wedge-shaped portion 17RP of the wedge member 17RW is placed within the support column 12R. Specifically, the wedge member 17RW is positioned between the larger diameter portion 15R2 of the protrusion 15R and the inner side of the front wall 12RF of the support column 12R.

The nut 17RN is threaded onto the bolt 17RB towards the head of the bolt 17RB, and then the bolt 17RB is inserted through the opening 17RO of the wedge member 17RW. The opening 17RO of the wedge member 17RW is not threaded and allows the bolt 17RB to freely insert therethrough.

However, the inner wall of the opening 15RO is threaded such that bolt 17RB must be threaded therethrough. The bolt 17RB is threaded through the opening 15RO of the protrusion 15R, until the tip of the bolt 17RB comes into contact with a fixed stop block 12RS on the inner face of the front wall 12RF of the support column 12R.

The stop block 12RS is positioned proximate to a lower periphery of the opening 16R. Specifically, as the bolt 17RB is threaded through the opening 15RO, the tip of the bolt 17RB moves towards the stop block 12RS and is eventually urged against the stop block 12RS.

This in turn causes the portion 15R1 of the protrusion 15R to be urged against the upper periphery of the opening 16R. This prevents motion of the support column 12R relative to the mounting member 14R in the vertical direction (i.e., up/down the mounting member 14R).

Figure 22:
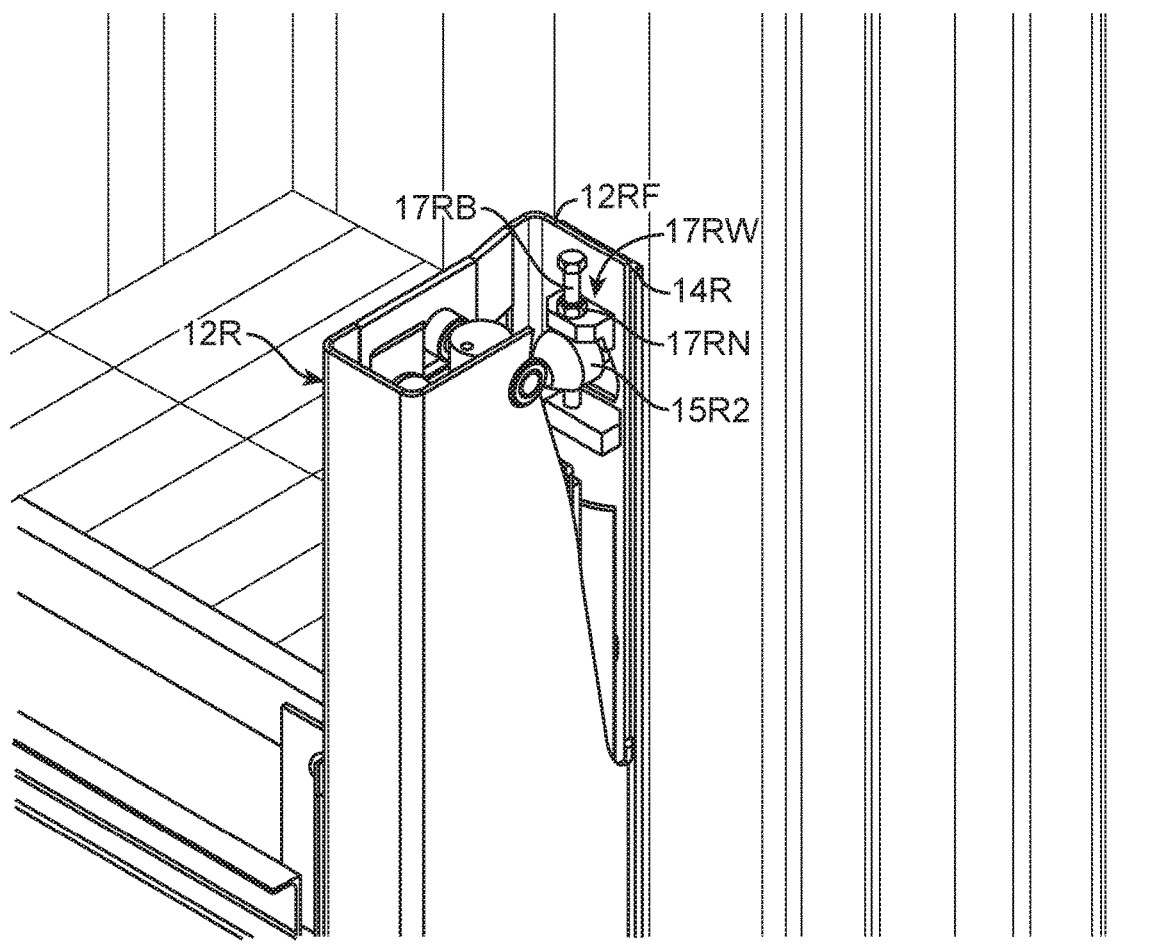
FIG. 22 shows another perspective view of an assembled securing mechanism comprising a securing device for a right side mounting member to secure the corresponding support column to the mounting member on the vehicle, according to one embodiment.

In order to secure the support column 12R to the mounting member 14R in the horizontal direction (i.e., towards/away from the mounting member 14R), the nut 17RN is threaded down the bolt 17RB towards the wedge member 17RW to urge the wedge-shaped portion 17RP between (and against) the portion 15R2 of the protrusion 15R and the support column wall 12RF, as shown in FIG. 22.

Figure 24:
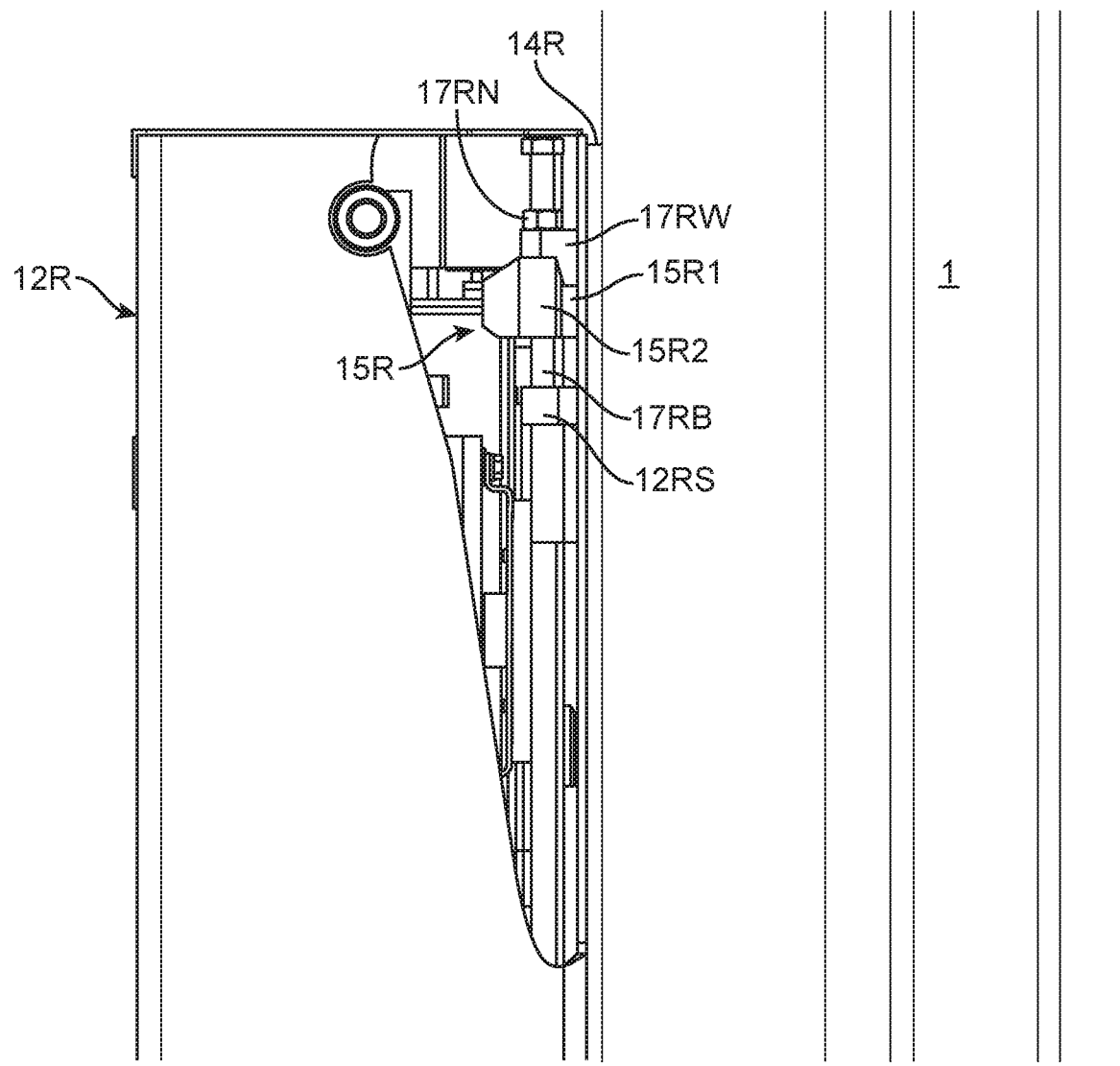
FIG. 24 shows a side view of a right side securing mechanism comprising a securing device for a mounting member to secure the corresponding support column to the mounting member on the vehicle, according to one embodiment.

In effect, the wedge-shaped portion 17RP essentially fills a gap between the protrusion portion 15R2 and the support column wall 12RF, causing the wall 12RF to be urged against the mounting member 14R, thereby preventing horizontal (i.e., towards/away from the mounting member 14R) motion of the upper periphery of the opening 15R of the column 12R on the protrusion portion 15R1 of the mounting member 14R. FIG. 24 shows a side view corresponding to FIG. 22.

The left side support column 12L, mounting member 14L and protrusion 15L are similar to the right side support column 12R, mounting member 14R and protrusion 15R, described above and as shown in FIG. 19. The left side also includes a securing device similar to the securing device 17R of the right side.

Figure 19:
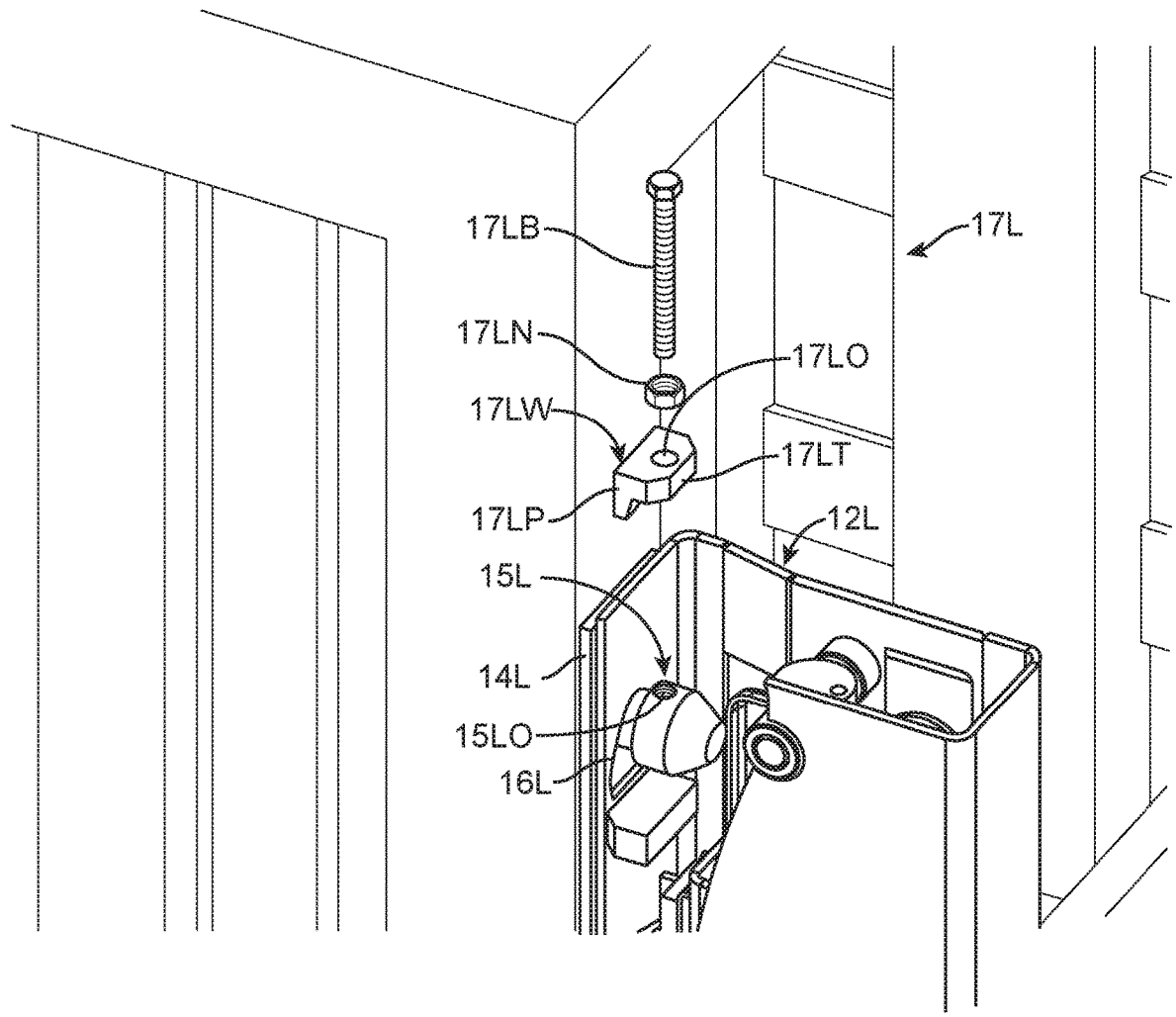
FIG. 19 shows another exploded perspective view of a securing mechanism comprising a securing device for a mounting member to secure the support column to the corresponding mounting member on the vehicle, according to one embodiment.

In one embodiment as shown in FIG. 19, similarly for securing the support column 12L to the mounting member 14R on the vehicle, the mounting system further includes a securing device 17L for the mounting member 14L, wherein the device 17L comprises a wedge member 17LW and corresponding threaded bolt 17LB and threaded nut 17LN.

The wedge member 17LW is essentially L-shaped in profile, having a top portion 17LT and a transverse wedge-shaped portion 17LP. The top portion 17LT includes an opening 17LO therethrough for receiving the bolt 17LB. Further, the protrusion 15L includes an opening 15LO through the portion 15L2 for receiving the bolt 17LB.

Figure 21:
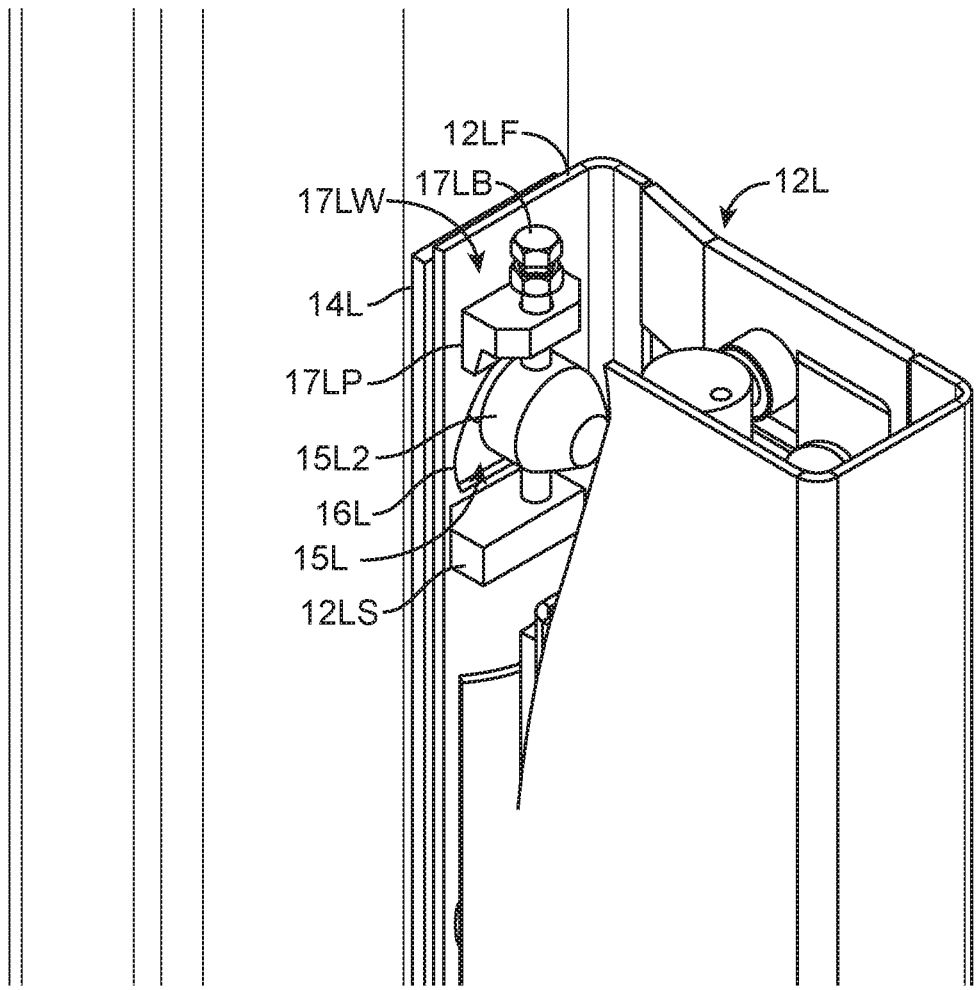
FIG. 21 shows a perspective view of an assembled securing mechanism comprising a securing device for a left side mounting member to secure the corresponding support column to the mounting member on the vehicle, according to one embodiment.

After the support column 12L is mounted (via the opening 16L) on the protrusion 15R of the mounting member 14L, as shown in FIG. 21, the wedge-shaped portion 17LP of the wedge member 17LW is placed within the support column 12L, between the larger diameter portion 15L2 of the protrusion 15L and the inner side of the front wall 12LF of the support column 12L.

The nut 17LN is threaded onto the bolt 17LB to move towards the head of the bolt 17LB, and then the bolt 17LB is inserted through the opening 17LO of the wedge member 17LW. The bolt 17LB is also threaded through the opening 15LO of the protrusion 15L, until it rests against a fixed stop block 12LS on the inner face of the front wall 12LF of the support column 12L.

The stop block 12LS is positioned proximate to a lower periphery of the opening 16L. The opening 17LO of the wedge member 17LW is not threaded and allows the bolt 17LB to freely insert therethrough. However, the inner wall of the opening 15LO is threaded such that bolt 17LB must be threaded therethrough.

As the bolt 17LB is threaded through the opening 15LO, the tip of the bolt 17LB moves towards the stop block 12LS and is eventually urged against the stop block 12LS (FIG. 21), which in turn causes the portion 15L1 of the protrusion 15L to be urged against the upper periphery of the opening 16L. This prevents motion of the support column 12L relative to the mounting member 14L in the vertical direction (i.e., up/down on mounting member 14R).

Figure 23:
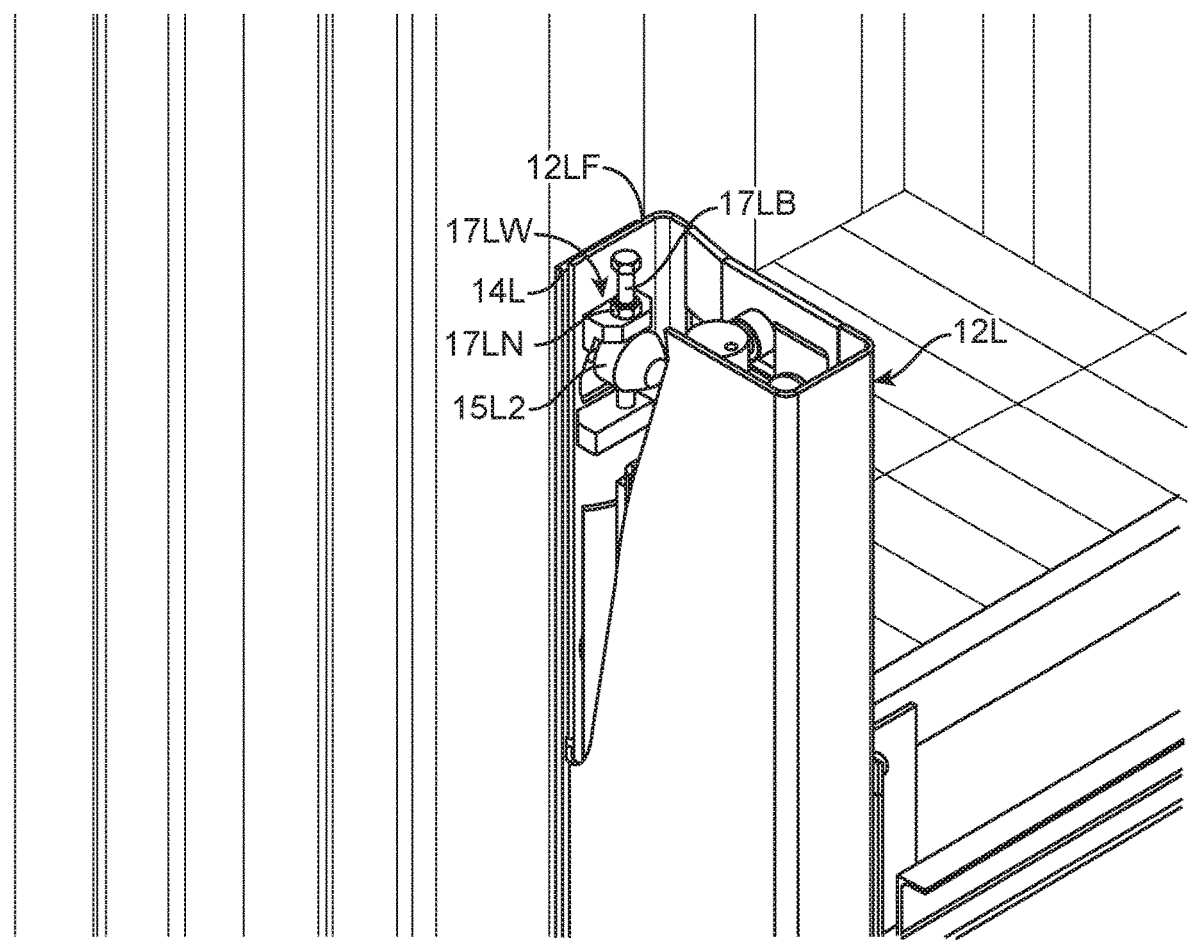
FIG. 23 shows another perspective view of an assembled securing mechanism comprising of a securing device for a right side mounting member to secure the corresponding support column to the mounting member on the vehicle, according to one embodiment.

In order to secure the support column 12L to the mounting member 14L in the horizontal direction (i.e., towards/away from the mounting member 14L), the nut 17LN is threaded down the bolt 17LB towards the wedge member 17LW to urge the wedge-shaped portion 17LP between (and against) the portion 15L2 of the protrusion 15L and the support column wall 12LF, as shown in FIG. 23.

Figure 25:
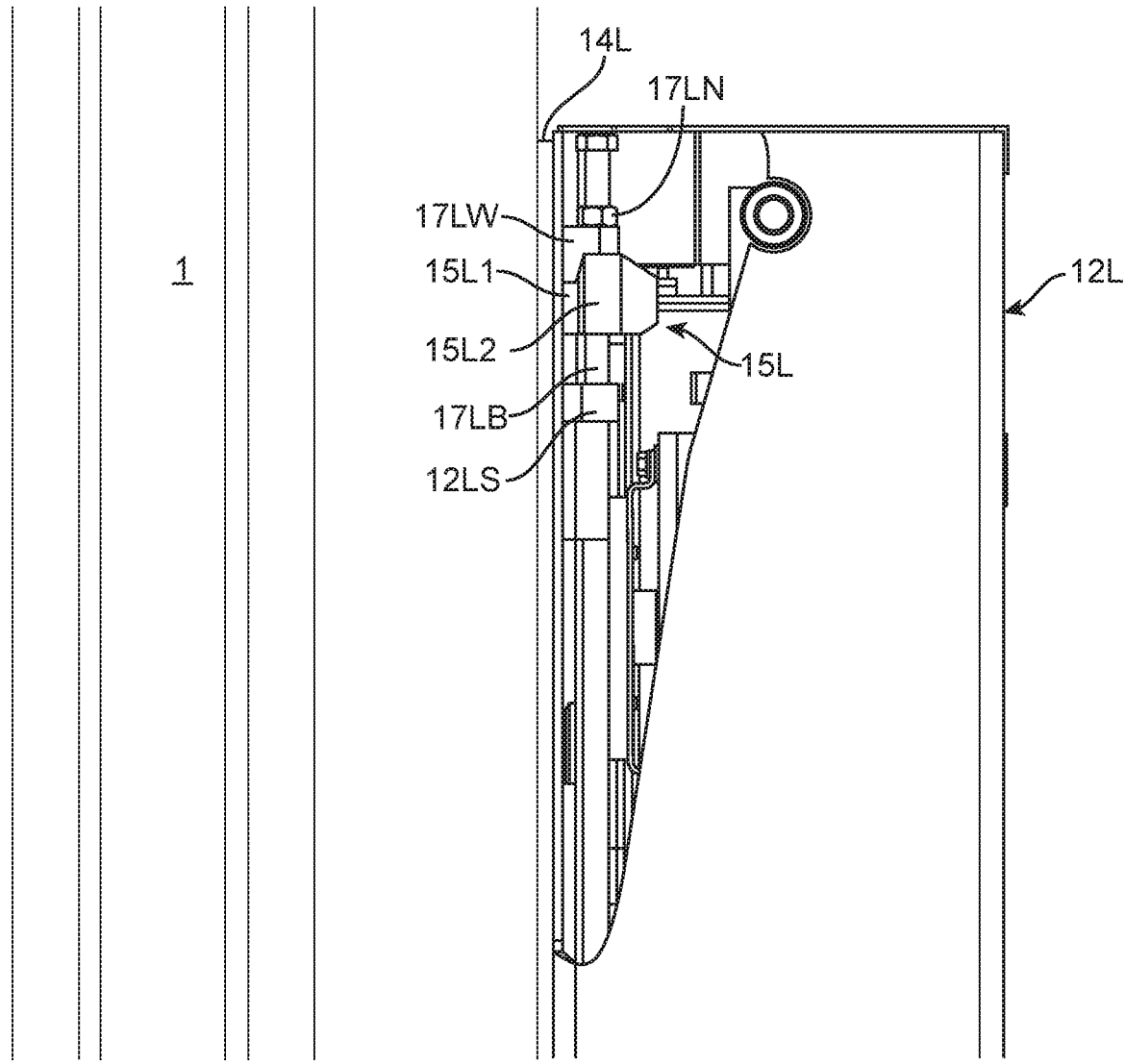
FIG. 25 shows a side view of a left side securing mechanism comprising a securing device for a mounting member to secure the corresponding support column to the mounting member on the vehicle, according to one embodiment.

In effect, the wedge-shaped portion 17LP essentially fills a gap between the protrusion portion 15L2 and the support column wall 12LF, causing the wall 12LF to be urged against the mounting member 14L, thereby preventing horizontal motion (i.e., towards/away from the mounting member 14L) of the upper periphery of the opening 15L of the column 12L on the protrusion portion 15L1 of the mounting member 14L. FIG. 25 shows a side view corresponding to FIG. 23.

Figure 17:
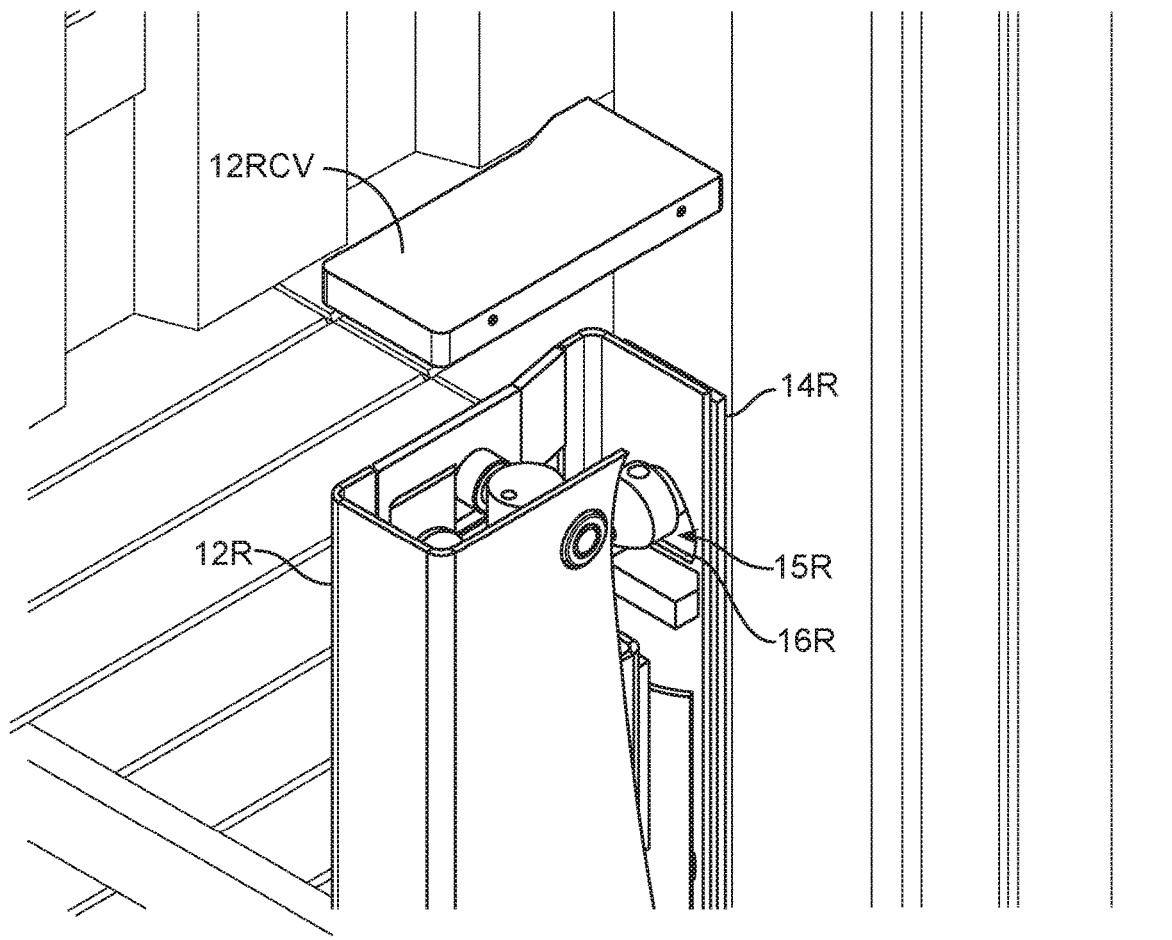
FIG. 17 shows a mounting column cover for a support column, according to one embodiment.
Figure 18:
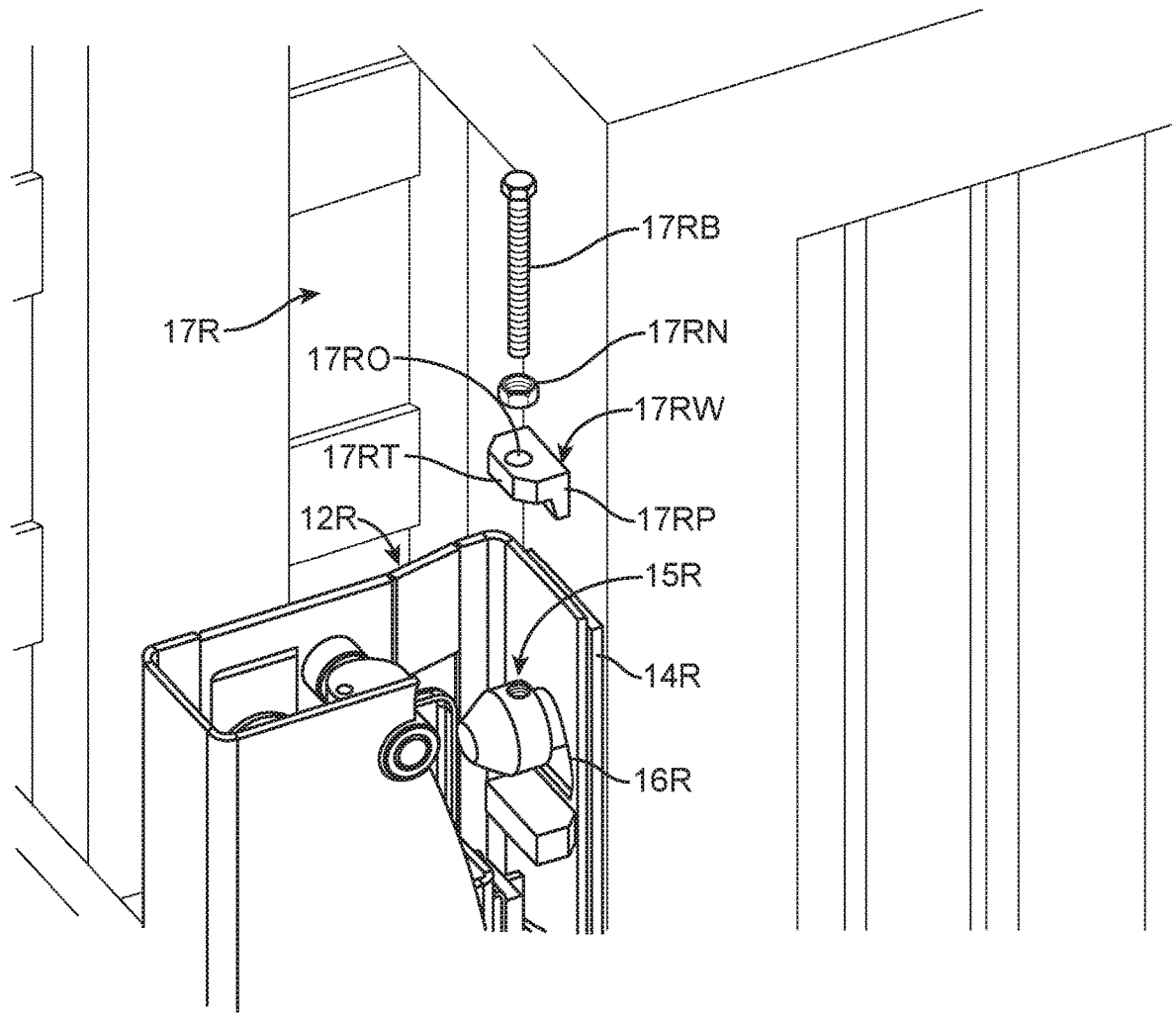
FIG. 18 shows an exploded perspective view of a securing mechanism comprising a securing device for a mounting member to secure the corresponding support column to the mounting member on the vehicle, according to one embodiment.
Figure 26:
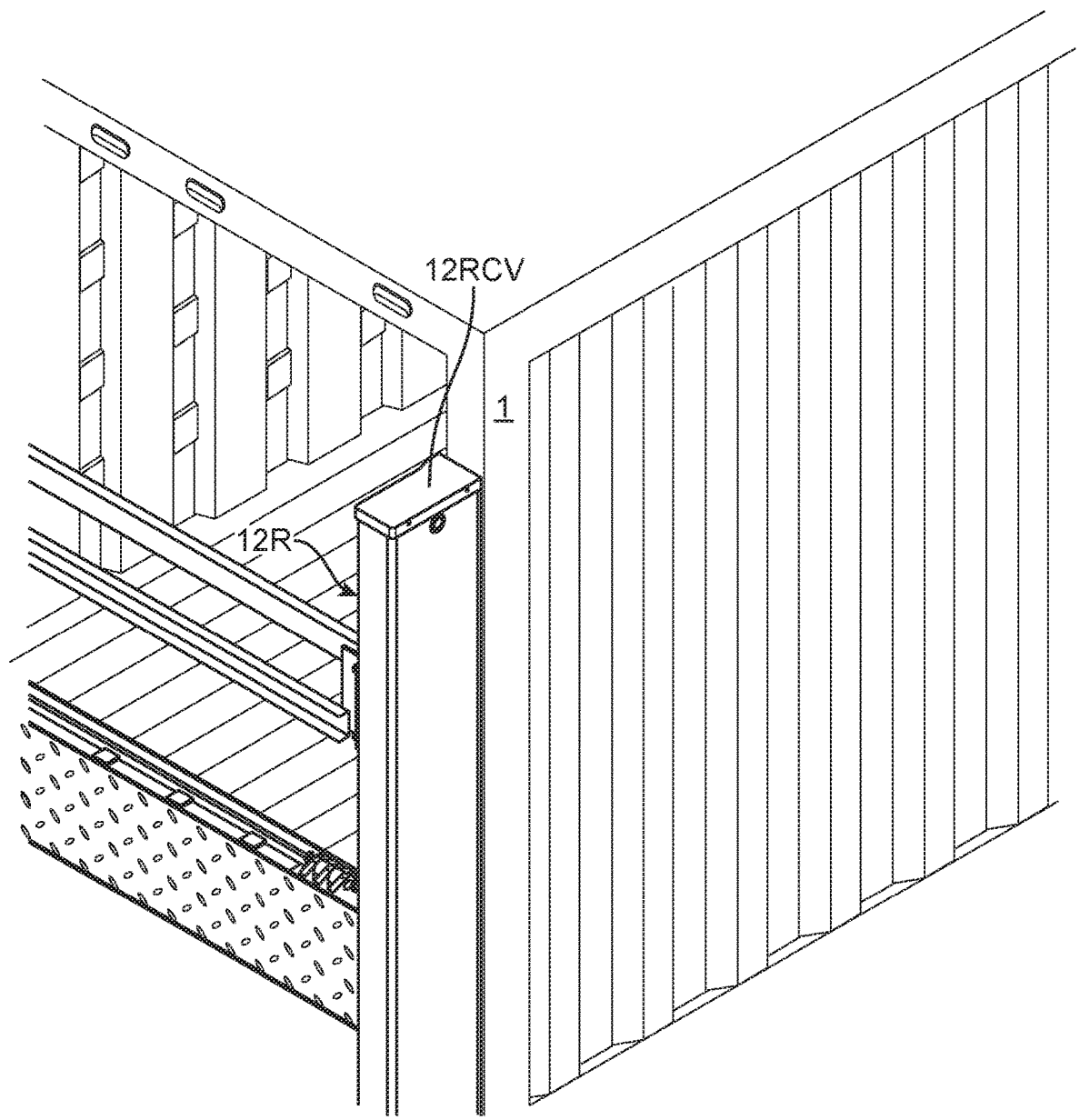
FIG. 26 shows a mounted support column, according to one embodiment.

After mounting the lift gate 10 on the mounting members 14L, 14R, and securing the lift gate 10 using the securing devices 17R, 17L, a cover is placed on top of each support column. FIG. 17 shows a cover 12RCV for the support column 12R. FIG. 26 shows the cover 12RCV placed on the support column 12R. The support column 12L has a similar cover.

Figure 27:
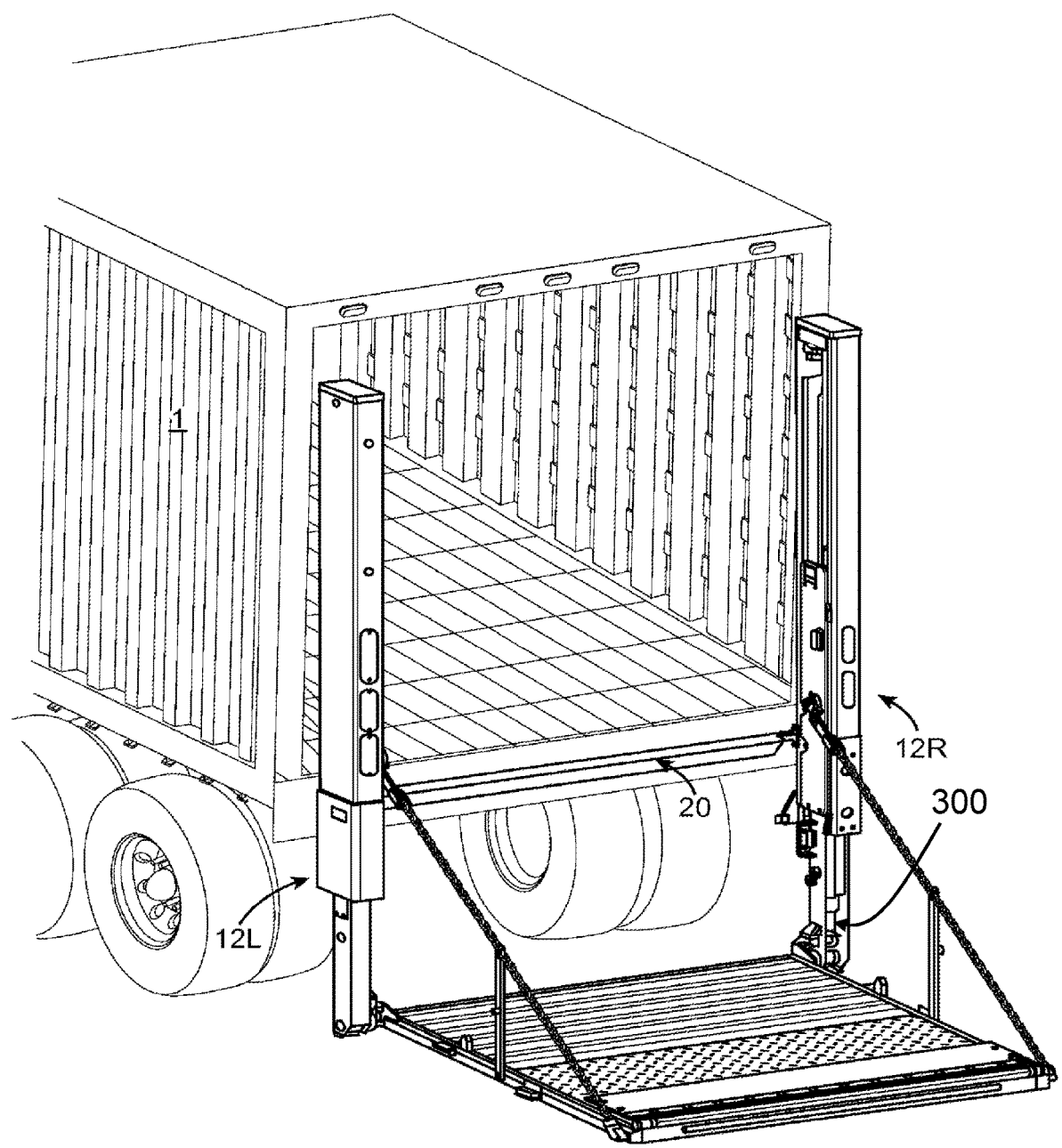
FIG. 27 shows a perspective view of the lift system as mounted on a vehicle opening using a mounting system, according to one embodiment.
Figure 28:
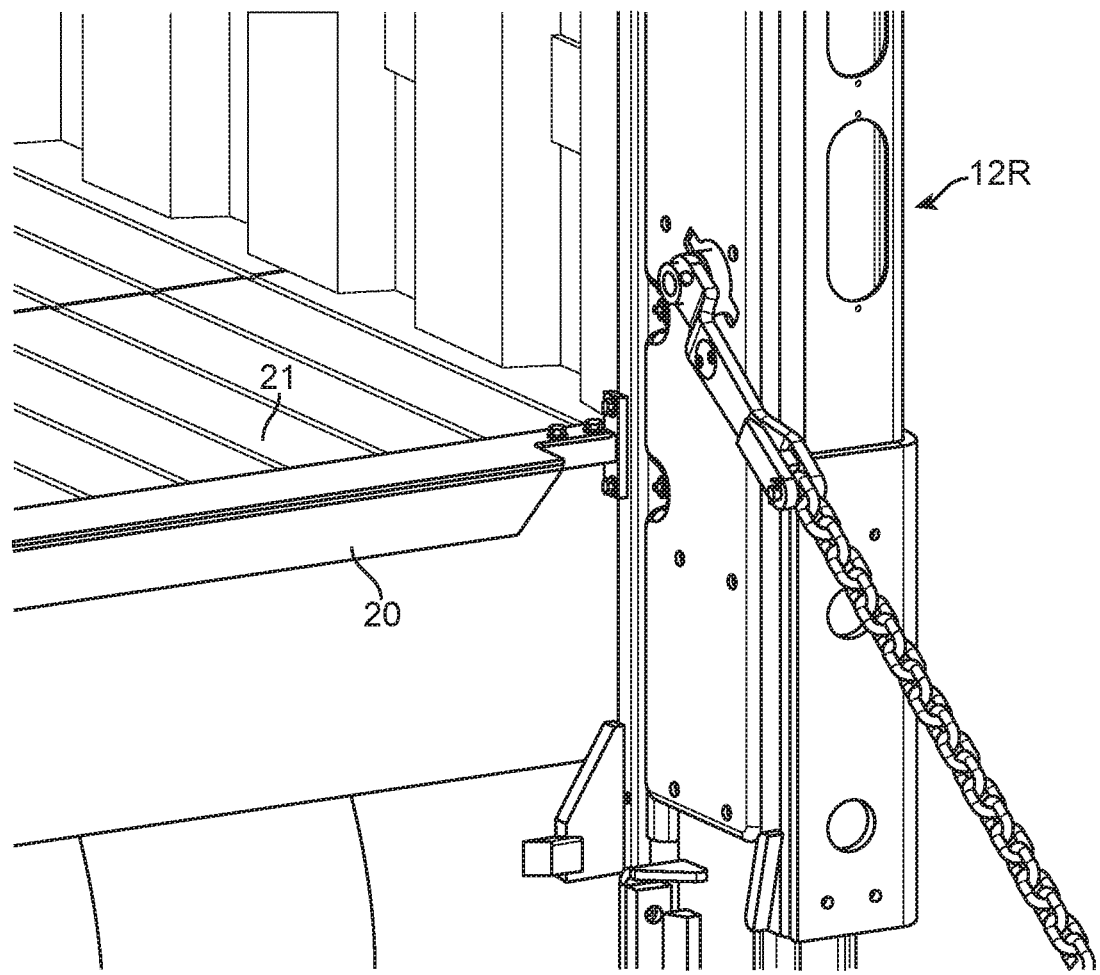
FIG. 28 shows a partial perspective view of the lift system shown in FIG. 27, according to one embodiment.
Figure 29:
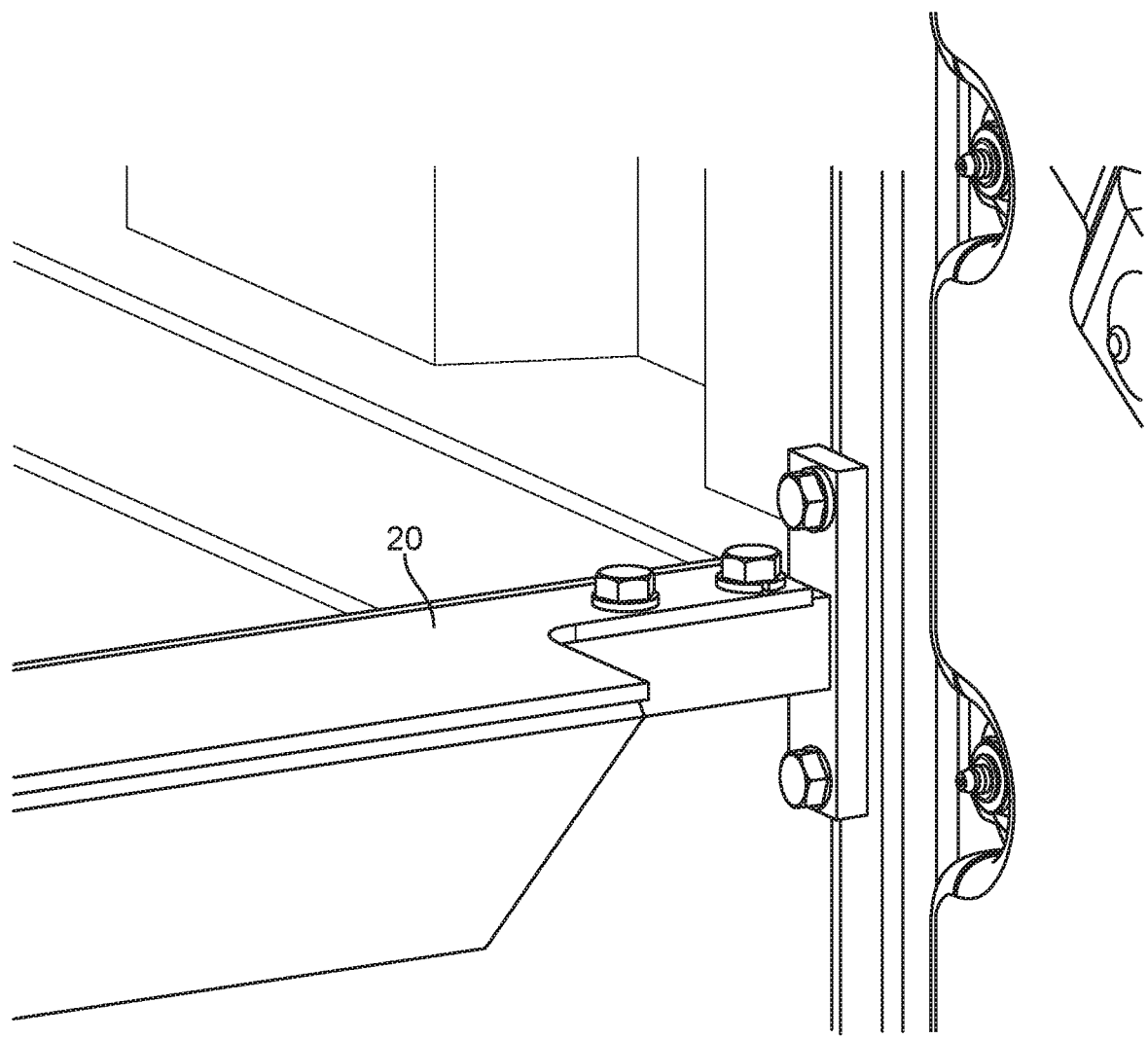
FIG. 29 shows another partial perspective view of the lift system shown in FIG. 27, according to one embodiment.

In one embodiment, the lift system further provides an essentially elongate rectangular extension plate 20 (FIGS. 27, 28, 29), which may also be attached to the vehicle 1, essentially flush with the vehicle bed 21 (FIG. 28) of the vehicle 1, such that in operation, when the lift platform 11 is raised to the vehicle bed 21, there is substantially continuous surface from the vehicle bed 21 to the lift platform 11 to ease movement of loads between the vehicle bed and the lift platform.

FIGS. 30-38 illustrate a second implementation of the aforementioned securing mechanism for each support column to secure that support column to the corresponding mounting member on the vehicle 1, according to an embodiment of the mounting system disclosed herein.

Figure 30:
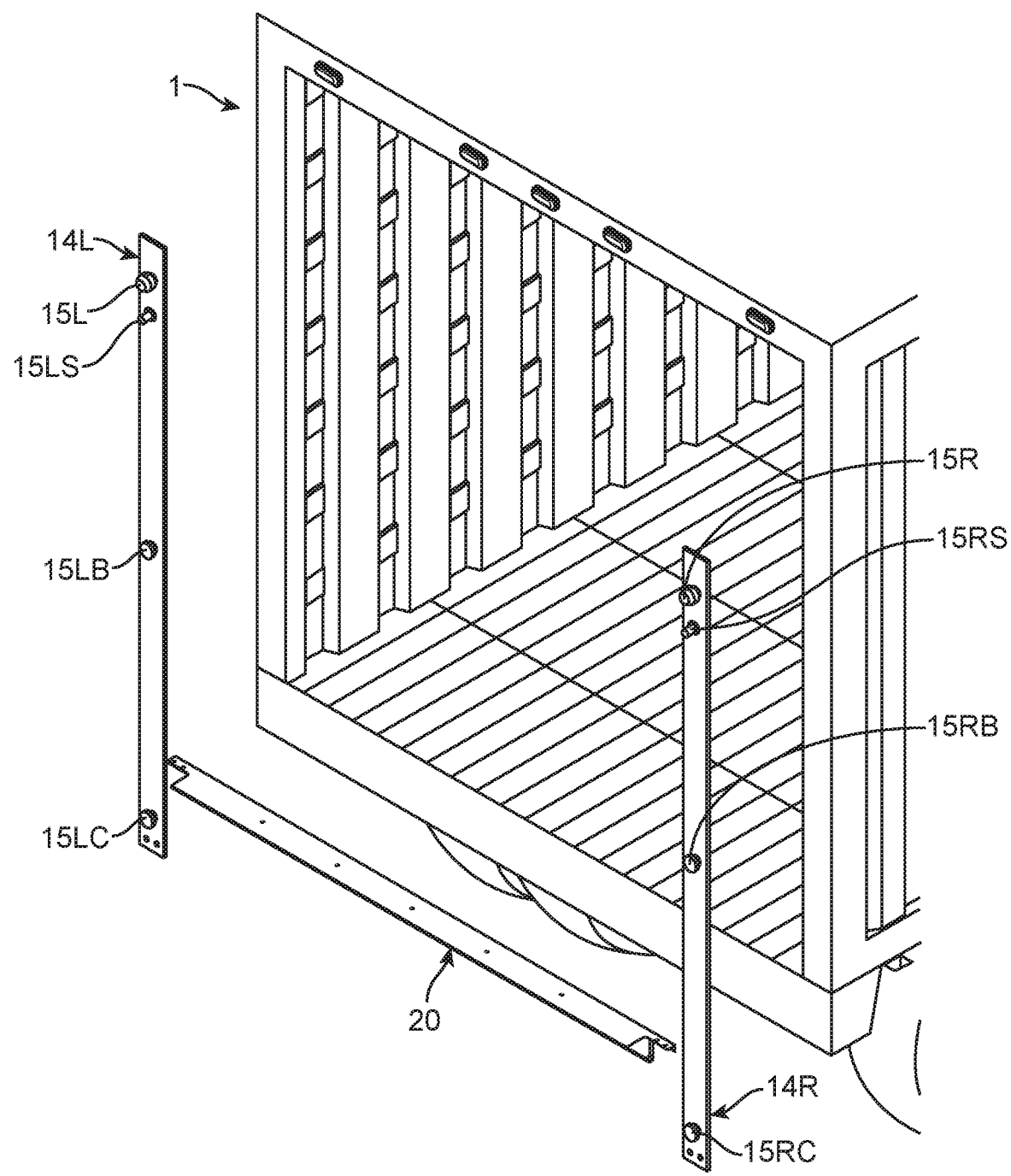
FIG. 30 illustrates another embodiment of the mounting members.
Figure 31:
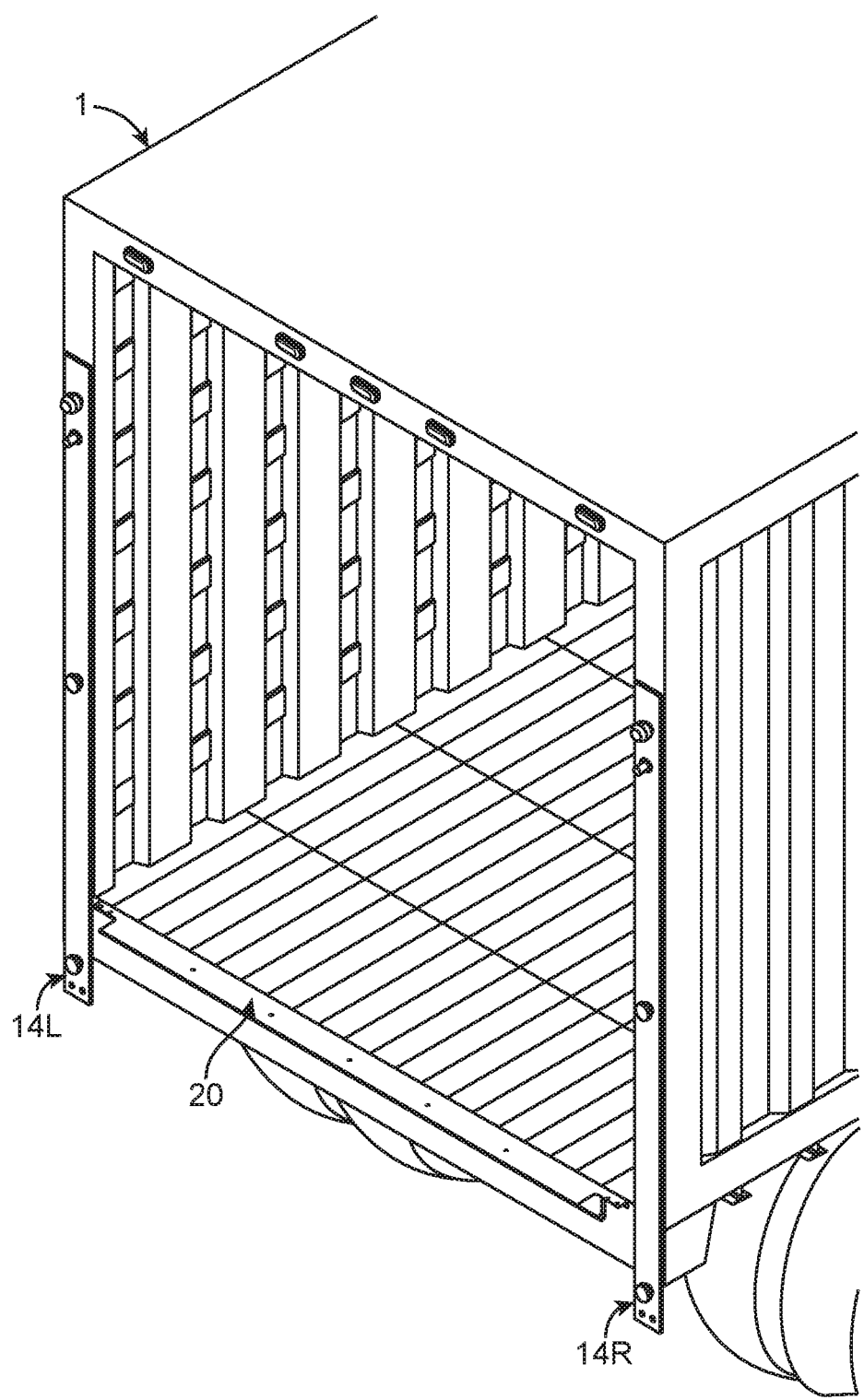
FIG. 31 illustrates the mounting members of FIG. 30 attached to a vehicle opening, according to one embodiment.
Figure 32:
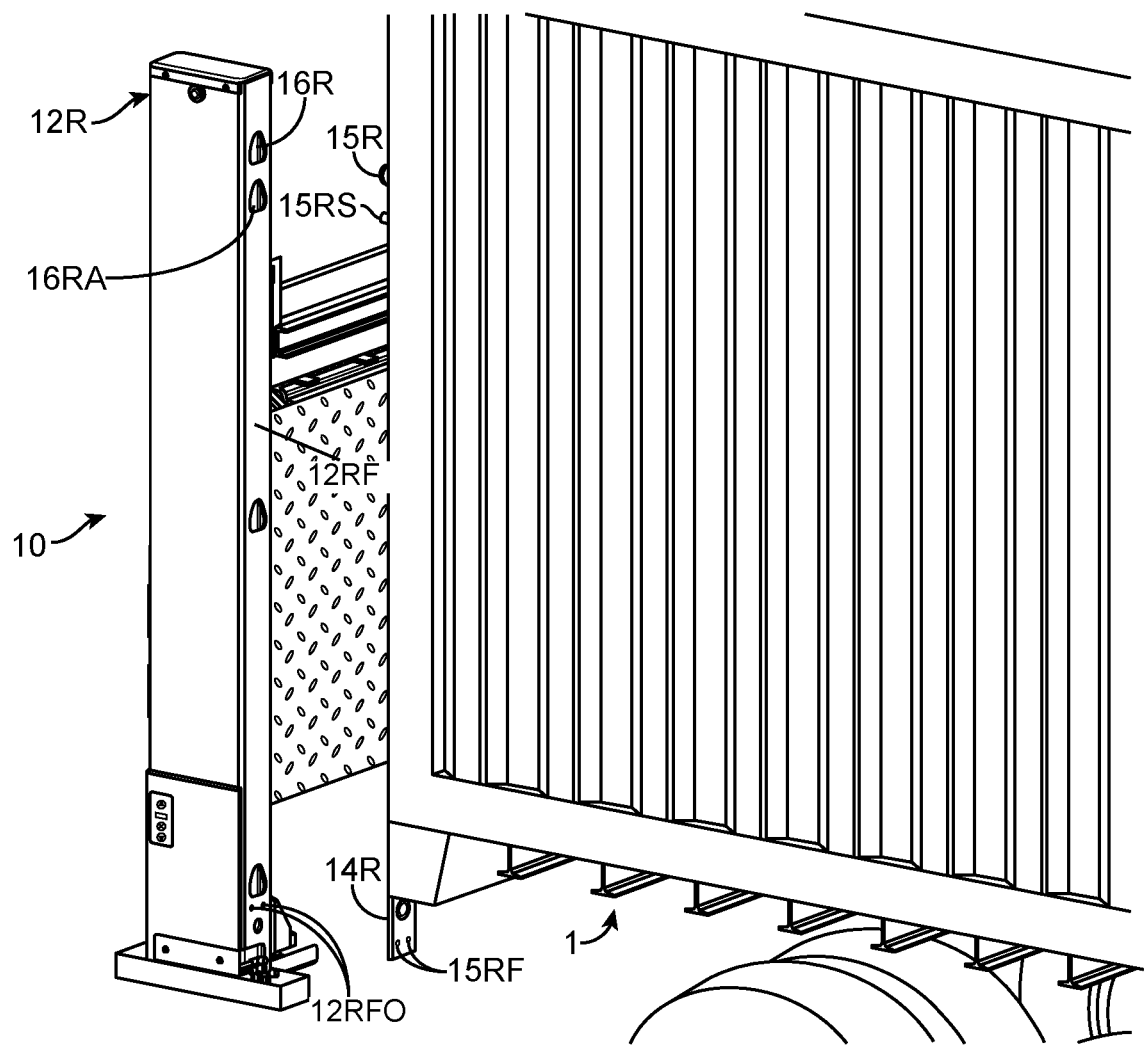
FIG. 32 shows a perspective view of a lift gate aligned with the rear opening of the vehicle, for mounting on mounting members of FIG. 31, according to one embodiment.
Figure 35A:
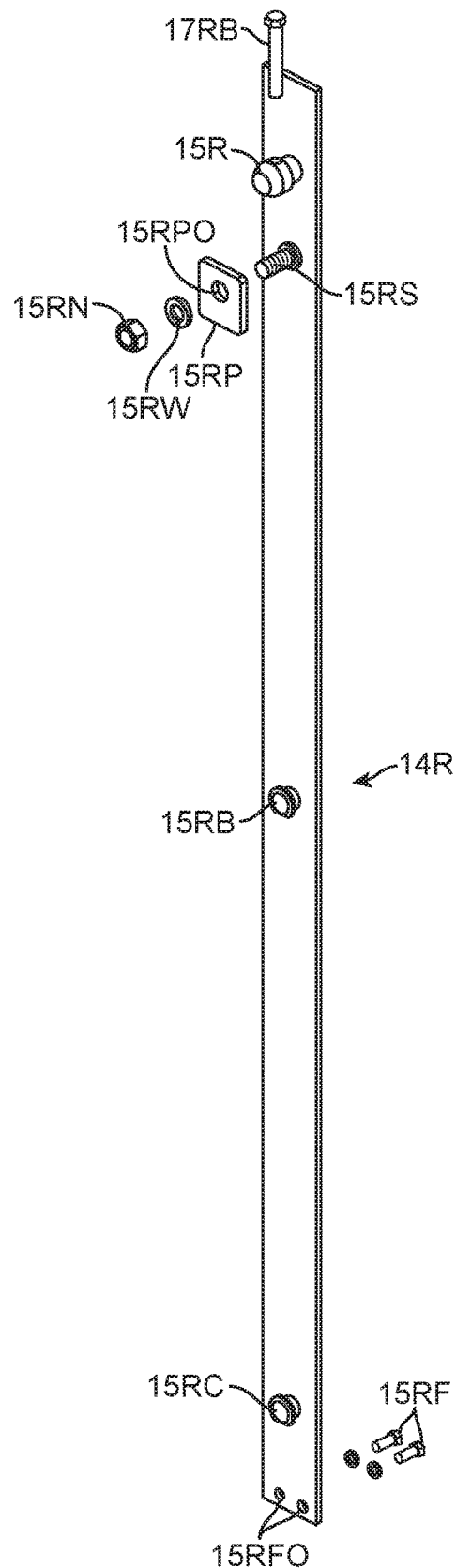
FIG. 35A shows a more detailed view of a right side mounting member in FIG. 30, according to one embodiment.
Figure 35B:
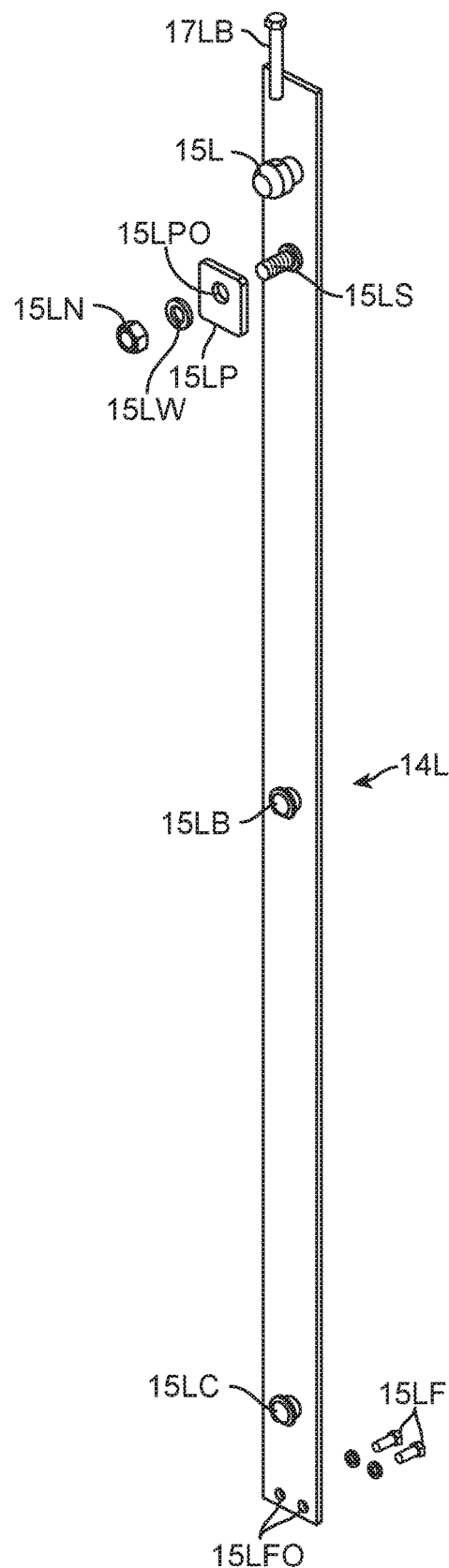
FIG. 35B shows a more detailed view of a left mounting member in FIG. 30, according to one embodiment.

FIG. 30 illustrates another embodiment of the mounting members 14L, 14R, and the extension plate 20, apart from the vehicle 1. FIG. 31 illustrates the mounting members 14L, 14R, and the extension plate 20, mounted to the vehicle 1. In this second implementation, as shown in FIG. 32, the securing mechanism for the mounting member 14R and corresponding column 12R includes a coupling protrusion 15RS comprising a threaded screw, in place of the protrusion 15RA on the mounting member 14R. FIG. 35A shows a more detailed view of mounting member 14R. FIG. 35B shows a more detailed view of mounting member 14L.

Similarly, the securing mechanism for the mounting member 14L and corresponding column 12L includes a coupling protrusion 15LS comprising a threaded screw, in place of the protrusion 15LA on the mounting member 14L. The securing mechanism for the mounting member 14L and corresponding column 12L is similar to that described hereinbelow for the mounting member 14R and corresponding column 12R, and therefore not described in detail.

FIG. 32 shows the lift gate 10 aligned with the rear opening of the vehicle 1, for mounting on mounting members 14L, 14R. As shown in FIG. 32, the protrusions 15R and 15RS on the mounting member 14R essentially align with receiving openings 16R and 16RA, respectively, on the corresponding column 12R. The threaded screw 15RS is positioned relative to the protrusion 15R such that the threaded screw 15RS is essentially aligned with the opening 16RA when the protrusion 15R is aligned with the opening 16R.

Figure 33:
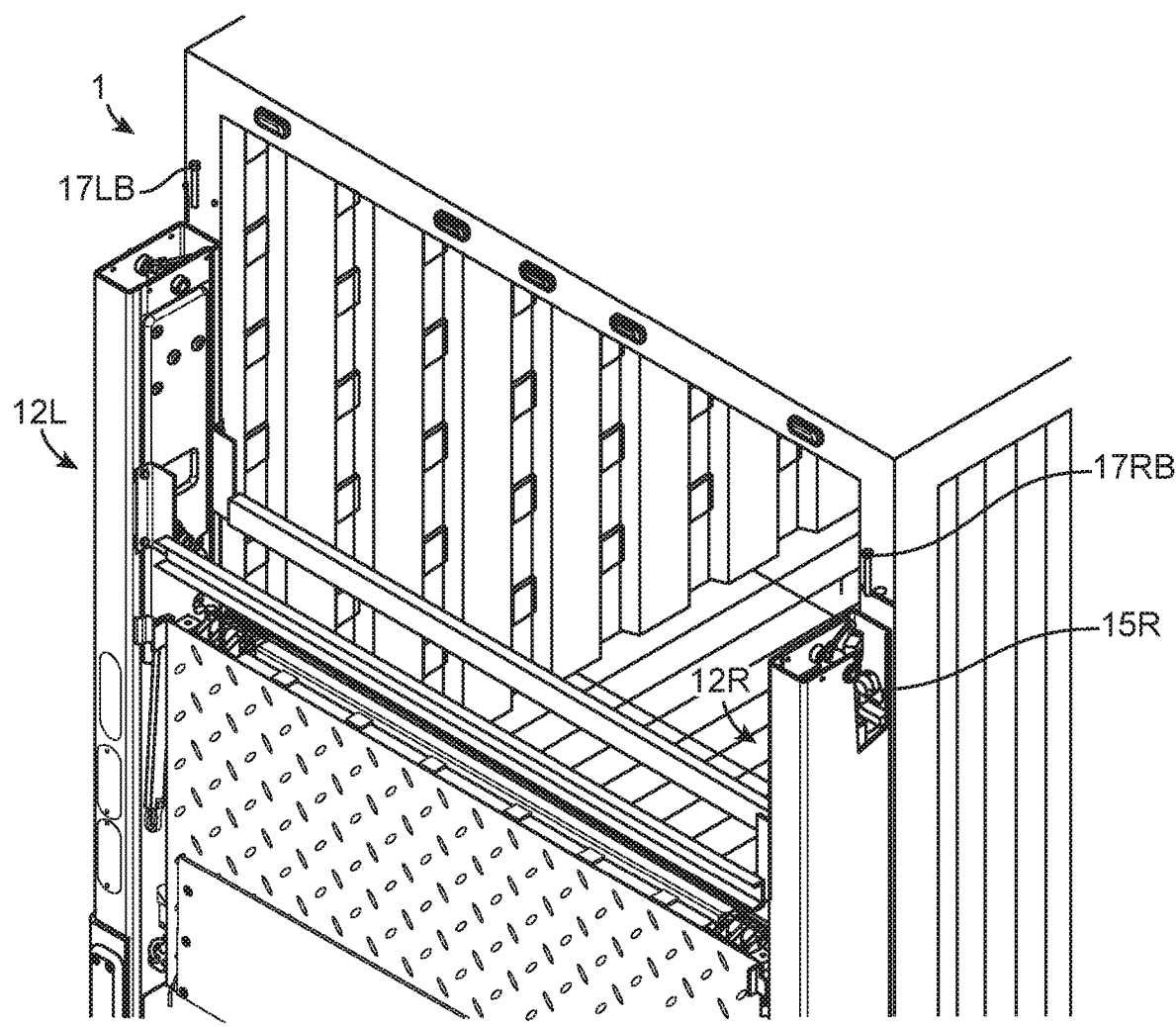
FIG. 33 shows a perspective view of the lift gate support as mounted on the mounting members of FIG. 31, according to one embodiment.

FIG. 33 shows a view of the columns 12R and 12L of the lift gate 10 as mounted on the mounting members 14R and 14L, respectively, on the vehicle opening. The protrusion 15R is received by the opening 16R on the column 12R. The protrusion 15L is received by the opening 16R on the column 12L. The screw 15LB is aligned with opening 15RO of the protrusion 15R, and screw 15RB is aligned with opening 15LO of the protrusion 15L, for threading.

Figure 34:
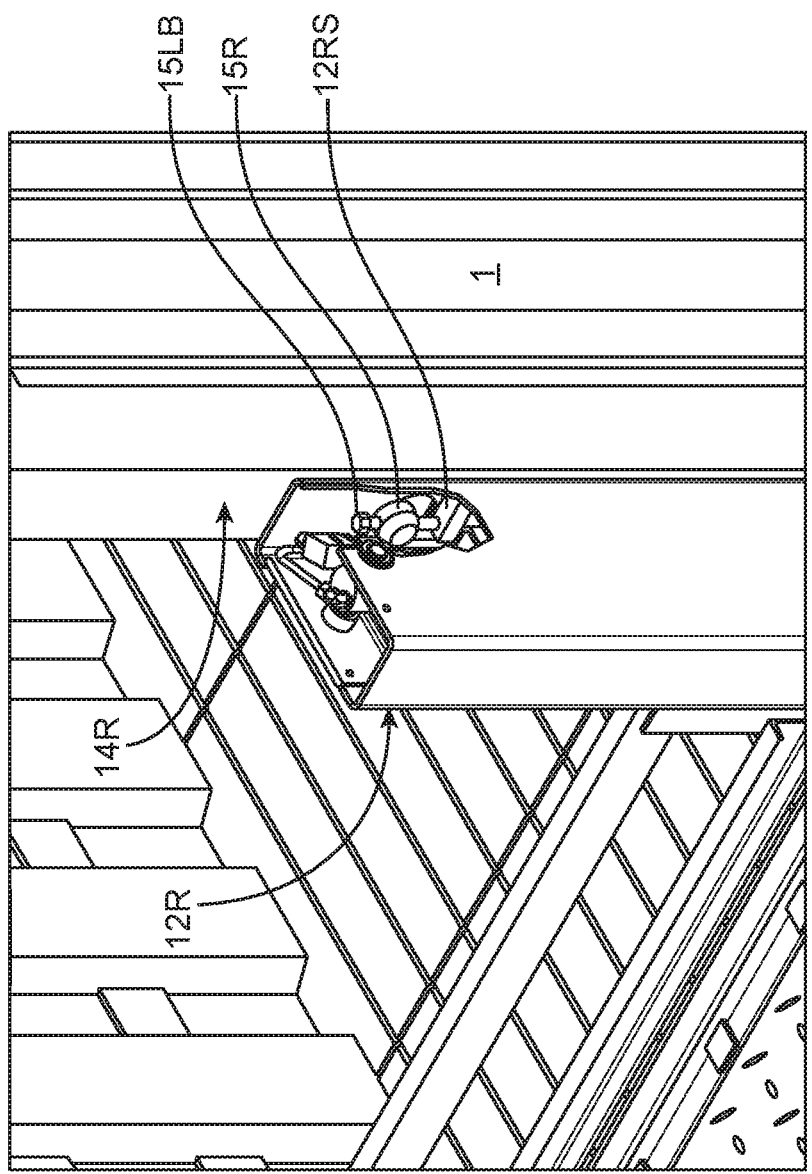
FIG. 34 shows a partial view of a right side support column as mounted on the corresponding mounting member on the vehicle opening in FIG. 31, according to one embodiment.

FIG. 34 shows a partial view of the column 12R of the lift gate 10 as mounted on the mounting member 14R on the vehicle opening. The protrusion 15R is received by the opening 16R on the column 12R. The screw 15LB is threaded in the opening 15RO of the protrusion 15R until the tip of the screw is urged against the block 12RS.

Figure 36:
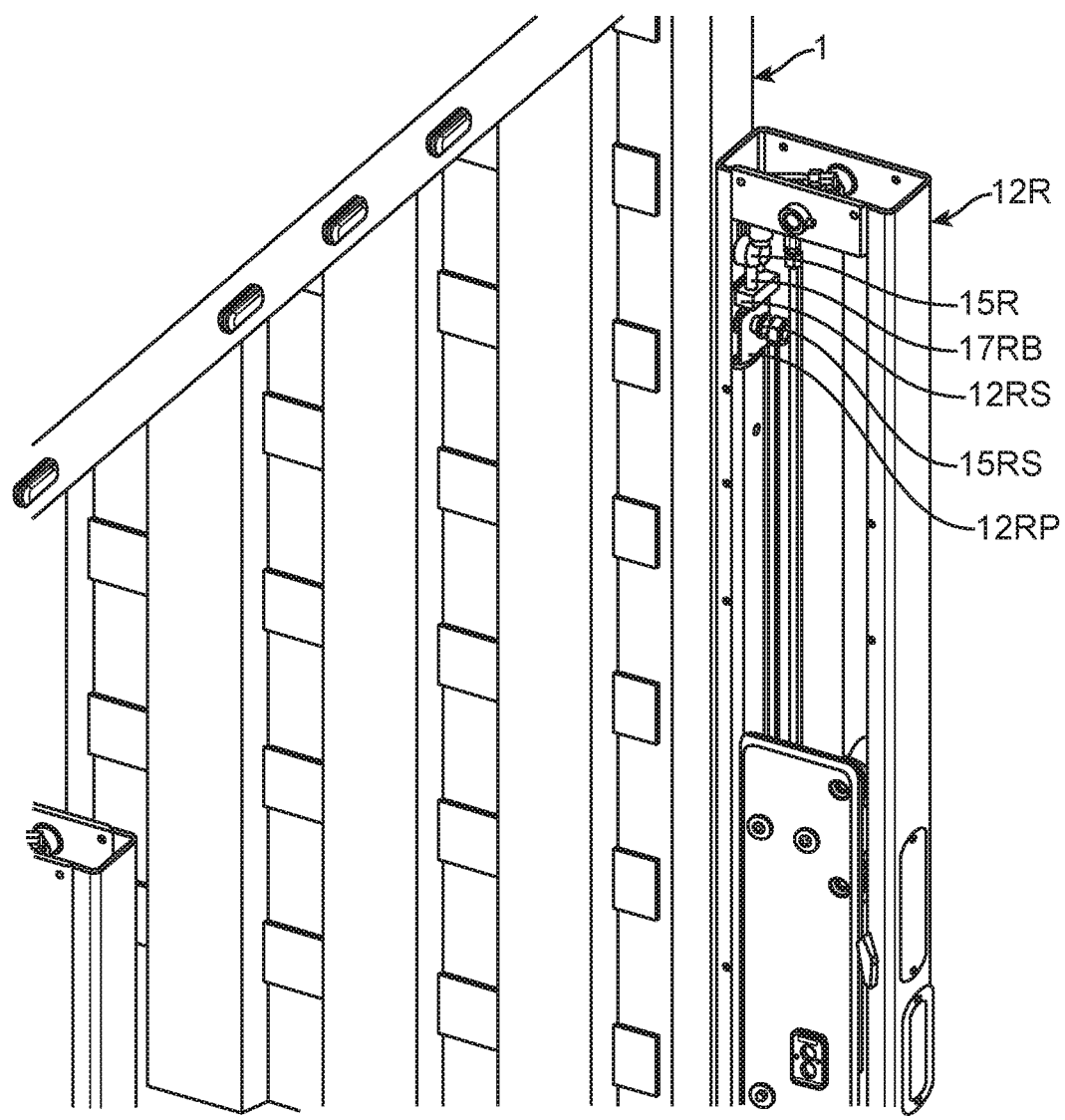
FIG. 36 shows a partial view of the interior of right side support column of the lift gate as mounted on the corresponding mounting member in FIG. 31, according to one embodiment.
Figure 37A:
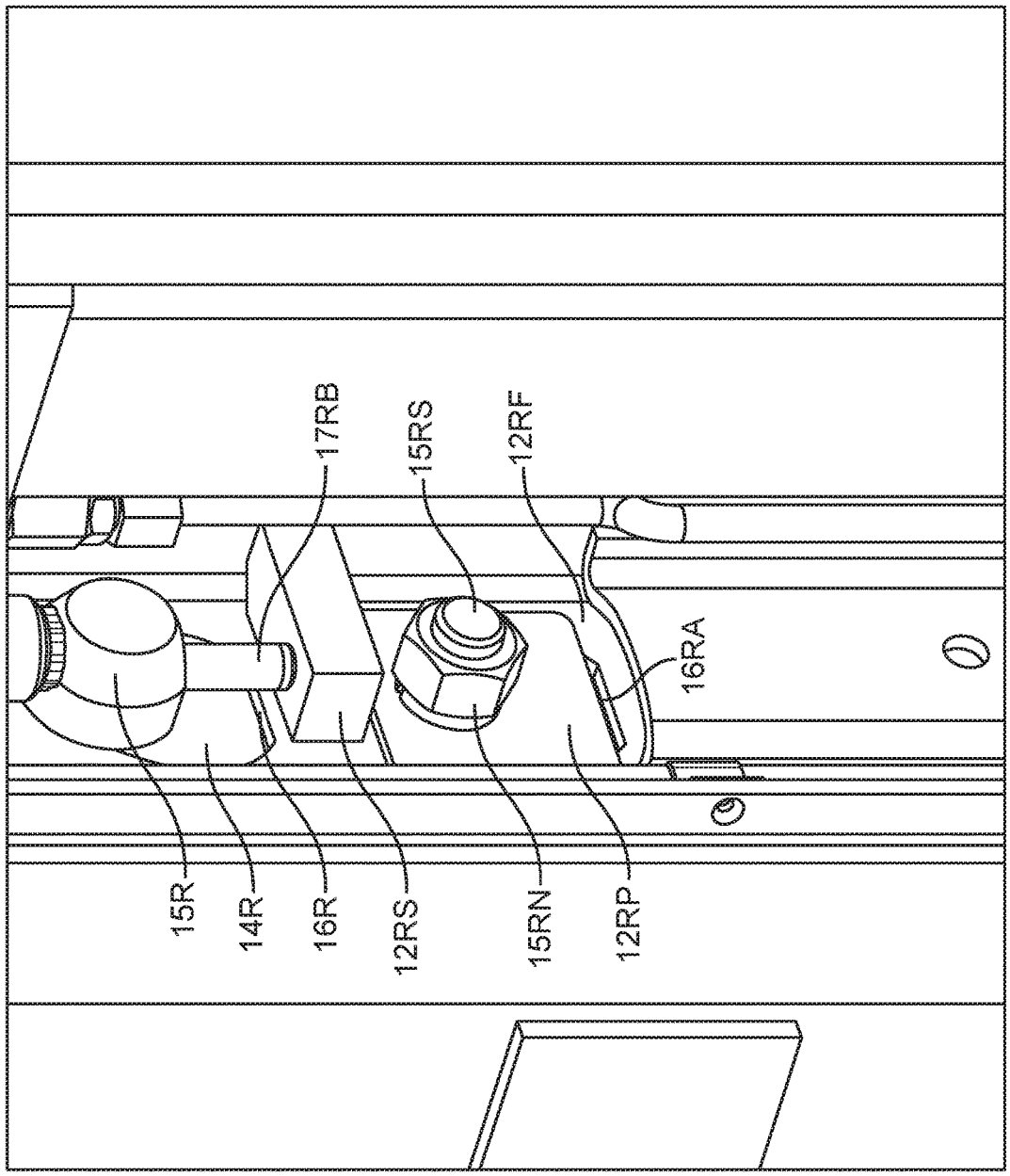
FIG. 37A shows a more detailed view of the interior of right side support column of the lift gate as mounted on the corresponding mounting member in FIG. 31, according to one embodiment.

FIG. 36 shows a partial view of the interior of column 12R of the lift gate 10 as mounted on the mounting member 14R on the vehicle opening. FIG. 37A shows a more detailed view of the interior of column 12R of the lift gate 10 as mounted on the mounting member 14R on the vehicle opening. The securing mechanism for the mounting member 14R further comprises a securing plate 15RP having an opening 15RPO for receiving the screw 15RS therethrough. The securing mechanism for the mounting member 14R further includes a threaded nut 15RN and washer 15RW (FIG. 35A), wherein the nut 15RN is configured for threaded engagement with the screw 15RS.

In mounting the column 12R on the mounting member 14R, the screw 15RS is positioned through the opening 16RA on the column 12R, then the plate 15RP (which is larger the opening 16RA) is mounted on the screw 15RS such that the screw 15RS passes through the opening 15RPO (FIG. 35A), such that the inner face of the front wall 12RF of the support column 12R is maintained between the mounting member 14R and the plate 15RP (FIG. 35A).

Then, the washer 15RW is placed on the screw 15RS and the nut 15RN is threaded on the screw 15RS to urge the plate 15RP against the inner face of the front wall 12RF of the support column 12R. This prevents horizontal motion (i.e., towards/away from the mounting member 14R) of the column 12R on the protrusion portion 15R1 of the mounting member 14R. In this embodiment, the wedge member 17RW need not be used since the plate 15RP maintains the column 12R against the mounting member 14R, as described.

As shown in FIG. 35B, the securing mechanism for the mounting member 14L further comprises a securing plate 15LP having an opening 15LPO for receiving the screw 15LS therethrough. The securing mechanism for the mounting member 14L further includes a threaded nut 15LN and washer 15LW, wherein the nut 15LN is configured for threaded engagement with the screw 15LS.

FIG. 37B shows a more detailed view of the interior of column 12L of the lift gate 10 as mounted on the mounting member 14L on the vehicle opening. In mounting the column 12L on the mounting member 14L, the screw 15LS is positioned through the opening 16LA on the column 12L, then the plate 15LP (which is larger the opening 16LA) is mounted on the screw 15LS such that the screw 15LS passes through the opening 15LPO, such that the inner face of the front wall 12LF of the support column 12L is maintained between the mounting member 14L and the plate 15LP.

Then, the washer 15LW is placed on the screw 15LS and the nut 15LN is threaded on the screw 15LS to urge the plate 15LP against the inner face of the front wall 12LF of the support column 12L. This prevents horizontal motion of the column 12L on the protrusion portion 15L1 of the mounting member 14L.

Figure 38:
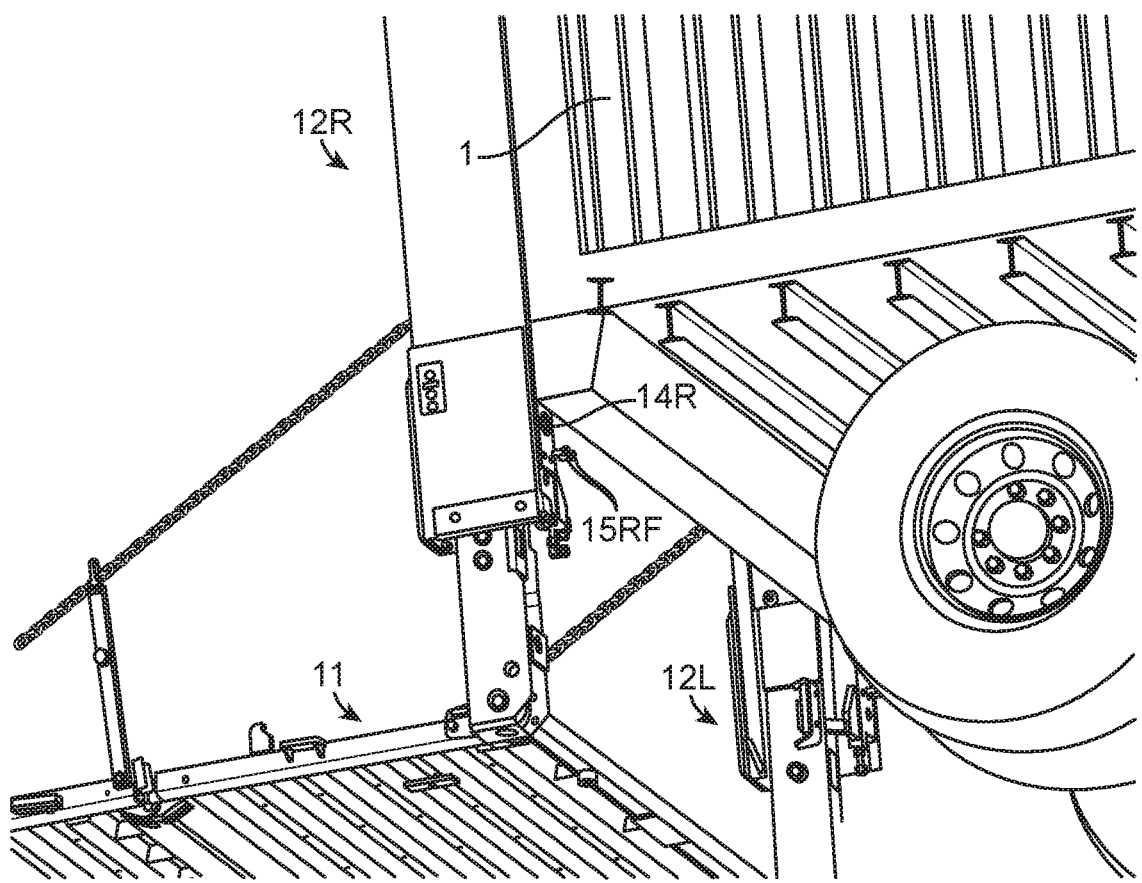
FIG. 38 shows a perspective view of the right side column as mounted on the corresponding mounting member, wherein the openings of the column are aligned with the openings of the mounting member shown in FIG. 35A, according to one embodiment.

As shown in FIG. 35A, in one embodiment, the lift system further provides a pair of fastening screws 15RF for additionally securing a lower portion of the column 12R to a lower portion of the mounting member 14R. The mounting member 14R has corresponding openings 15RFO for receiving the threaded screws therethrough. As shown in FIG. 32, the face 12RF of the column 12R includes corresponding openings 12RFO for threadedly receiving the screws 15RF, to further secure the column 12R to the mount member 14R. FIG. 38 shows column 12R as mounted on the mounting member 14R, wherein the openings 12RFO of the column 12R are aligned with the openings 15RFO of the mounting member 14R (FIG. 35A), and screws 15RF are to be threaded therethrough to further secure the mounting member 14R and column 12R together. The mounting member 14L and column 12L are also further secured together using a similar mechanism.

As shown in FIG. 35B, similarly in one embodiment the lift system further provides a pair of fastening screws 15LF for additionally securing a lower portion of the column 12L to a lower portion of the mounting member 14L. The mounting member 14L has corresponding openings 15LFO for receiving the threaded screws therethrough. As shown in FIG. 32, the face 12LF of the column 12L includes corresponding openings 12LFO for threadedly receiving the screws 15LF, to further secure the column 12L to the mount member 14L.

In the embodiments described herein, the mechanisms for mounting the column 12L on the mounting member 14L and securing them together, are similar (and preferably identical) to the mechanisms for mounting the column 12R on the mounting member 14R, and securing them together. The mounting system can be made from a rigid material such as a metal.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof; however, other versions are possible. Therefore, the spirit and scope of the appended claims should not be limited to the description of the preferred versions contained herein.

What is claimed is:

1. A mounting system for mounting a lift gate on a structure, the lift gate having a lift platform supported between a pair of spaced support columns, the mounting system comprising:
    a first mounting member configured for attachment onto said structure, wherein the first mounting member includes a first support protrusion for engaging an opening in a wall of a first lift gate support column of the pair of spaced support columns, wherein the first mounting member comprises a first elongate planar mounting plate including the first support protrusion on a planar surface of said first elongate planar mounting plate; and
    a second mounting member configured for attachment onto said structure, wherein the second mounting member includes a second support protrusion for engaging an opening in a wall of a second lift gate support column of the pair of spaced support columns, wherein the second mounting member comprises a second elongate planar mounting plate including the second support protrusion on a planar surface of said second elongate planar mounting plate;
    wherein when the first and second mounting members are attached to the structure and the first and second lift gate support columns are mounted on the first and second support protrusions, the first and second mounting members support the lift gate on the structure such that the first and second lift gate support columns remain stationary relative to the structure, for raising and lowering the lift platform by the first and second lift gate support columns relative to the structure;
    wherein said structure comprises a vehicle having an opening for access into the vehicle, wherein when the first and second mounting members are attached to the vehicle proximate the opening and the first and second lift gate support columns are mounted on the first and second support protrusions, the first and second mounting members support the lift gate on the structure for raising and lowering the lift platform via the first and second lift gate support columns relative to the vehicle;
    wherein said planar surface of the first elongate planar mounting plate including said first support protrusion faces the first lift gate support column, and said planar surface of the second elongate mounting plate including said second support protrusion faces the second lift gate support column;
    wherein at least a portion of each of the first and second support protrusions is disposed within a hollow body of the first and second lift gate support columns; and
    wherein at least a portion of the lift platform remains in a plane between the first and second lift gate support columns when raising and lowering the lift platform.

2. The system of claim 1, wherein:
the first support protrusion of the first mounting member includes a first portion attached to the first elongate planar mounting plate and a second portion attached to the first portion, wherein the second portion is larger in diameter than the first portion, such that when the opening of the first lift gate support column is resting on the first portion, the second portion maintains the second lift gate support column between the first mounting plate and the second portion.

3. The system of claim 2, wherein:
the second support protrusion of the second mounting member includes a first cylindrical portion attached to the second elongate planar mounting plate and a second essentially cylindrical portion attached to the first cylindrical portion, wherein the second cylindrical portion is larger in diameter than the first cylindrical portion, such that when the opening of the first lift gate support column is resting on the first portion, the second portion maintains the second lift gate support column between the second mounting plate and the second portion.

4. The system of claim 2, wherein:
the first support protrusion further comprises an essentially conical portion attached to the second portion; and
the second protrusion further comprises an essentially conical portion attached to the second portion;
wherein each of the first and second lift gate support columns is hollow and generally elongate with a rectangular cross section and includes an actuator disposed within the body of each of the first and second lift gate support columns for moving the lift platform.

5. The system of claim 1, further comprising:
a first wedge member for the first mounting member, the first wedge member configured for placement between the wall of the first support column and a first portion within the first support column, causing the wall of the first support column to be urged against the first mounting member; and a second wedge member for the second mounting member, the second wedge member configured for placement between the wall of the second support column and a second portion within the second support column, causing the wall of the second support column to be urged against the second mounting member.

6. The system of claim 1, wherein:

the first support protrusion of the first mounting member includes a threaded opening for threadedly receiving a threaded bolt, wherein the bolt is configured for threading through the opening of the first support protrusion until the bolt urges against a fixed stop block on an inner face of the wall of the first support column; and the second support protrusion of the second mounting member includes a threaded opening for threadedly receiving a second threaded bolt, wherein the second bolt is configured for threading through the opening of the first support protrusion until the second bolt urges against a fixed stop block on an inner face of the wall of the second support column.

7. The system of claim 1, wherein:

the first mounting member further includes a coupling protrusion for passing through an opening in the wall of said first lift gate support column; and the system further includes a securing member for engaging the coupling protrusion, such that the inner face of the wall of the first support column is maintained between the first mounting member and the securing member.

8. The system of claim 7, wherein:

the second mounting member further includes a coupling protrusion for passing through an opening in the wall of said second lift gate support column; and the system further includes a securing member for engaging the coupling protrusion, such that the inner face of the wall of the second support column is maintained between the second mounting member and the securing member.

9. The system of claim 8, wherein:

the first support protrusion of the first mounting member includes a threaded opening for threadedly receiving a threaded bolt, wherein the bolt is configured for threading through the opening of the first support protrusion until the bolt urges against a fixed stop block on an inner face of the wall of the first support column; and the second support protrusion of the second mounting member includes a threaded opening for threadedly receiving a second threaded bolt, wherein the second bolt is configured for threading through the opening of the first support protrusion until the second bolt urges against a fixed stop block on an inner face of the wall of the second support column.

10. An apparatus comprising:

a lift gate system comprising a lift platform and a pair of spaced support columns, wherein the lift platform is supported between said pair of spaced support columns for raising and lowering the lift platform therebetween; and a mounting system for mounting the lift gate system on a vehicle opening;

wherein the mounting system comprises:

a first mounting member configured for attachment onto said vehicle, wherein the first mounting member includes a first support protrusion for engaging an opening in a wall of a first lift gate support column of the pair of spaced support columns, wherein the first mounting member comprises a first elongate planar mounting plate including the first support protrusion on a planar surface of said first elongate planar mounting plate; and a second mounting member configured for attachment onto said vehicle, wherein the second mounting member includes a second support protrusion for engaging an opening in a wall of a second lift gate support column of the pair of spaced support columns, wherein the second mounting member comprises a second elongate planar mounting plate including the second support protrusion on a planar surface of said second elongate planar mounting plate;

wherein when the first and second mounting members are attached to the vehicle and the first and second lift gate support columns are mounted on the first and second support protrusions such that the first and second lift gate support columns remain stationary relative to said vehicle, the first and second mounting members support the lift gate on the vehicle for raising and lowering the lift platform via the spaced support columns relative to the vehicle;

wherein said planar surface of the first elongate planar mounting plate including said first support protrusion faces the first lift gate support column, and said planar surface of the second elongate mounting plate including said second support protrusion faces the second lift gate support column;

wherein at least a portion of each of the first and second support protrusions is disposed within a hollow body of the first and second lift gate support columns; and wherein at least a portion of the lift platform remains in a plane between the first and second lift gate support columns when raising and lowering the lift platform.

11. The apparatus of claim 10, wherein:

the first support protrusion includes a first portion attached to the first elongate planar mounting plate and a second portion attached to the first portion, wherein the second portion is larger in diameter than the first portion, such that when the opening of the first lift gate support column is resting on the first portion, the second portion maintains the first lift gate support column between the first mounting plate and the second portion; and the second support protrusion includes a first cylindrical portion attached to the second elongate planar mounting plate and a second essentially cylindrical portion attached to the first cylindrical portion, wherein the second cylindrical portion is larger in diameter than the first cylindrical portion, such that when the opening of the second lift gate support column is resting on the first portion, the second portion maintains the second lift gate support column between the second mounting plate and the second portion.

12. The apparatus of claim 11, wherein:

the first protrusion further comprises an essentially conical portion attached to the second portion; and the second protrusion further comprises an essentially conical portion attached to the second portion;

wherein each of the first and second lift gate support columns is hollow and generally elongate with a rectangular cross section and includes an actuator disposed within the body of each of the first and second lift gate support columns for moving the lift platform.

13. The apparatus of claim 10, further comprising:
a first wedge member for the first mounting member, the first wedge member configured for placement between the wall of the first support column and a second portion within the first support column, causing the wall of the first support column to be urged against the first mounting member; and
a second wedge member for the second mounting member, the second wedge member configured for placement between the wall of the second support column and a second portion within the second support column, causing the wall of the second support column to be urged against the second mounting member.

14. The apparatus of claim 10, wherein:
the first support protrusion of the first mounting member includes a threaded opening for threadedly receiving a threaded bolt, wherein the bolt is configured for threading through the opening of the first support protrusion until the bolt urges against a fixed stop block on an inner face of the wall of the first support column; and
the second support protrusion of the second mounting member includes a threaded opening for threadedly receiving a second threaded bolt, wherein the second bolt is configured for threading through the opening of the first support protrusion until the second bolt urges against a fixed stop block on an inner face of the wall of the second support column.

15. The apparatus of claim 10, wherein:
the first mounting member further includes a coupling protrusion for passing through an opening in the wall of said first lift gate support column;
the apparatus further includes a securing member for engaging the coupling protrusion, such that the inner face of the wall of the first support column is maintained between the first mounting member and the securing member;
the second mounting member further includes a second coupling protrusion for passing through an opening in the wall of said second lift gate support column; and
the apparatus further includes a second securing member for engaging the second coupling protrusion, such that the inner face of the wall of the second support column is maintained between the second mounting member and the second securing member.

16. A mounting system for mounting a lift gate on a vehicle, the lift gate having a lift platform supported between a pair of spaced support columns, the mounting system comprising:
a first mounting member configured for attachment onto said vehicle, wherein the first mounting member includes a first support protrusion for engaging an opening in a wall of a first lift gate support column of the pair of spaced support columns, wherein the first mounting member comprises a first elongate planar mounting plate including the first support protrusion on a planar surface of said first elongate planar mounting plate; and
a second mounting member configured for attachment onto said vehicle, wherein the second mounting member includes a second support protrusion for engaging an opening in a wall of a second lift gate support column of the pair of spaced support columns, wherein the second mounting member comprises a second elongate planar mounting plate including the second support protrusion on a planar surface of said second elongate planar mounting plate;
wherein when the first and second mounting members are attached to the vehicle proximate an access opening, and the first and second lift gate support columns are mounted on the first and second support protrusions such that the lift gate support columns remain stationary relative to said vehicle, the first and second mounting members support the lift gate on the vehicle for raising and lowering the lift platform via the first and second lift gate support columns relative to the vehicle opening;
wherein said planar surface of the first elongate planar mounting plate including said first support protrusion faces the first lift gate support column, and said planar surface of the second elongate mounting plate including said second support protrusion faces the second lift gate support column;
wherein at least a portion of each of the first and second support protrusions is disposed within a hollow body of the first and second lift gate support columns; and
wherein at least a portion of the lift platform remains in a plane between the first and second lift gate support columns when raising and lowering the lift platform.

17. The system of claim 16, wherein:
the first protrusion further comprises an essentially conical portion attached to a second portion;
the second protrusion further comprises an essentially conical portion attached to the second portion;
wherein the first support protrusion includes a first portion attached to the first elongate planar mounting plate and the second portion attached to the first portion, wherein the second portion is larger in diameter than the first portion, such that when the opening of the first lift gate support column is resting on the first portion, the second portion maintains the first lift gate support column between the first mounting plate and the second portion; and
wherein the second support protrusion includes a first cylindrical portion attached to the second elongate planar mounting plate and a second essentially cylindrical portion attached to the first cylindrical portion, wherein the second cylindrical portion is larger in diameter than the first cylindrical portion, such that when the opening of the second lift gate support column is resting on the first portion, the second portion maintains the second lift gate support column between the second mounting plate and the second portion.

18. The system of claim 17, further comprising:
a first wedge member for the first mounting member, the first wedge member configured for placement between the wall of the first support column and said second portion within the first support column, causing the wall to be urged against the first mounting member; and
a second wedge member for the second mounting member, the second wedge member configured for placement between the wall of the second support column and said second portion within the second support column, causing the wall to be urged against the second mounting member;
wherein the first support protrusion of the first mounting member includes a threaded opening for threadedly receiving a threaded bolt, wherein the bolt is configured for threading through the opening of the first support protrusion until the bolt urges against a fixed stop block on an inner face of the wall of the first support column; and wherein the second support protrusion of the second mounting member includes a threaded opening for threadedly receiving a second threaded bolt, wherein the second bolt is configured for threading through the opening of the second support protrusion until the second bolt urges against a fixed stop block on an inner face of the wall of the second support column; wherein each support column is hollow and generally elongate with a rectangular cross section and includes an actuator disposed within the body of the second support column for moving the lift platform.

* * * * *